(12) United States Patent
Liu

(10) Patent No.: US 12,490,151 B2
(45) Date of Patent: Dec. 2, 2025

(54) QoS CONTROL METHOD AND APPARATUS, AND READABLE STORAGE MEDIUM

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 469 days.

(21) Appl. No.: 17/968,060

(22) Filed: Oct. 18, 2022

(65) Prior Publication Data

US 2023/0051269 A1 Feb. 16, 2023

Related U.S. Application Data

(63) Continuation of application No. PCT/CN2020/092148, filed on May 25, 2020.

(30) Foreign Application Priority Data

Apr. 22, 2020 (WO) ................ PCT/CN2020/086214

(51) Int. Cl.
*H04W 28/24* (2009.01)
*H04L 47/74* (2022.01)
(Continued)

(52) U.S. Cl.
CPC ........... *H04W 28/24* (2013.01); *H04W 24/10* (2013.01); *H04W 92/18* (2013.01)

(58) Field of Classification Search
CPC ..... H04W 28/24; H04W 24/10; H04W 92/18; H04W 88/04; H04W 28/0268; H04W 76/14; H04L 47/748
See application file for complete search history.

(56) References Cited

U.S. PATENT DOCUMENTS

2018/0279319 A1* 9/2018 Yu ..................... H04W 40/12
2019/0028954 A1 1/2019 Lee et al.
(Continued)

FOREIGN PATENT DOCUMENTS

CN 101998304 A 3/2011
CN 104159266 A 11/2014
(Continued)

OTHER PUBLICATIONS

Extended European Search Report issued in corresponding European application No. 20932247.8, mailed Jul. 24, 2023.
(Continued)

*Primary Examiner* — Harry H Kim
(74) *Attorney, Agent, or Firm* — BAYES PLLC

(57) ABSTRACT

Provided are a QoS control method and apparatus, and a readable storage medium. A source UE sends request information to a target UE according to the triggering of an application, wherein the request information comprises QoS information of service data that is transmitted between the source UE and the target UE; and when receiving the request information issued by the source UE to the target UE, a relay UE can obtain QoS information of the service data that is transmitted between the source UE and the relay UE, and QoS information of the service data that is transmitted between the relay UE and the target UE.

14 Claims, 9 Drawing Sheets

(51) Int. Cl.
  *H04W 24/10*  (2009.01)
  *H04W 28/02*  (2009.01)
  *H04W 76/14*  (2018.01)
  *H04W 88/04*  (2009.01)
  *H04W 92/18*  (2009.01)

(56) References Cited

U.S. PATENT DOCUMENTS

| | | | |
|---|---|---|---|
| 2020/0059980 A1 | 2/2020 | Hong et al. | |
| 2021/0298070 A1* | 9/2021 | Zhang | H04W 74/04 |
| 2022/0279610 A1* | 9/2022 | Fan | H04W 76/11 |
| 2022/0337990 A1* | 10/2022 | Ebrahim Rezagah | H04W 76/14 |
| 2022/0338092 A1* | 10/2022 | Wang | H04W 76/14 |
| 2023/0345558 A1* | 10/2023 | Zhao | H04W 76/14 |

FOREIGN PATENT DOCUMENTS

| | | |
|---|---|---|
| CN | 105207787 A | 12/2015 |
| CN | 108989993 A | 12/2018 |
| CN | 110035564 A | 7/2019 |
| CN | 110169097 A | 8/2019 |
| CN | 110268787 A | 9/2019 |
| CN | 110602801 A | 12/2019 |
| EP | 3614702 A1 | 2/2020 |
| WO | 2017028294 A1 | 2/2017 |

OTHER PUBLICATIONS

International Search Report issued in International application No. PCT/CN2020/086214, mailed Jan. 25, 2021.
Written Opinion of the International Searching Authority issued in International application No. PCT/CN2020/086214, mailed Jan. 25, 2021.
Oppo, "KI#4, New Sol: QoS control for UE-to-UE Relay", S2-2003947, 3GPP SA WG2 Meeting #139E Jun. 1-12, 2020, Elbonia.
Huawei et al., "Open issues of Solution #6", S2-2000493, SA WG2 Meeting #136AH Incheon, South Korea, Jan. 13-17, 2020.
Samsung, "Key issue#3 update: to enable network controlled interactive service", S2-2000608, SA WG2 Meeting #S2-136AH Jan. 13-17, 2020, Incheon, Korea.
International Search Report issued in International application No. PCT/CN2020/092148, mailed Jan. 14, 2021.
Written Opinion of the International Searching Authority issued in International application No. PCT/CN2020/092148, mailed Jan. 14, 2021.
Priority Review issued in corresponding Chinese application No. 202310144876.2, mailed Jun. 27, 2024.
First Office Action issued in corresponding Chinese application No. 202310144876.2, mailed Jul. 4, 2024.
Notice of Allowance issued in corresponding European application No. 20932247.8, mailed Jul. 22, 2024.

* cited by examiner

QoS CONTROL METHOD AND APPARATUS, AND READABLE STORAGE MEDIUM

CROSS-REFERENCE TO RELATED APPLICATIONS

The present application is a continuation of International Application No. PCT/CN2020/092148, filed on May 25, 2020, which is based upon and claims the benefit of priority to International Application No. PCT/CN2020/086214, filed on Apr. 22, 2020 and entitled "QOS CONTROL METHOD AND APPARATUS, AND READABLE STORAGE MEDIUM", both of which are incorporated herein by reference in their entireties.

TECHNICAL FIELD

The embodiments of the present disclosure relate to the field of communications technologies, and in particular, to a QoS control method, apparatus, and readable storage medium.

BACKGROUND

In the 5th generation mobile networks (5G), a terminal device with a proximity service (prose) capability can communicate with another terminal device with a proximity service capability through the PC5 interface. The two terminal devices respectively determine a quality of service (Quality of Service, QoS) parameter corresponding to the service data transmission according to the initiated service. When two terminal devices with prose capability are far apart, a relay terminal device with prose capability can perform communication relay.

SUMMARY

Embodiments of the present disclosure provide a QoS control method, apparatus, and readable storage medium.

According to the first aspect, an embodiment of the present disclosure provides a QoS control method, including:
  receiving, by a first terminal device, first information from a second terminal device, wherein the first information is used to request service interaction between the second terminal device and a third terminal device;
  obtaining, by the first terminal device, second QoS information according to the first information, wherein the second QoS information is QoS information of the service interaction between the first terminal device and the third terminal device; and
  transmitting, by the first terminal device, the second QoS information to the third terminal device.

According to the second aspect, an embodiment of the present disclosure provides a QoS control method, including:
  transmitting, by a second terminal device, first information to a first terminal device, wherein the first information is used to request service interaction between the second terminal device and a third terminal device; and
  obtaining, by the second terminal device, first QoS information, wherein the first QoS information is QoS information of the service interaction between the second terminal device and the first terminal device.

According to the third aspect, an embodiment of the present disclosure provides a QoS control method, including:
  receiving, by a third terminal device, second QoS information transmitted by a first terminal device, wherein the second QoS information is QoS information for service interaction between the first terminal device and the third terminal device.

According to the fourth aspect, an embodiment of the present disclosure provides a terminal device which is a first terminal device and includes:
  a transceiver module, configured to receive first information from a second terminal device, wherein the first information is used to request service interaction between the second terminal device and a third terminal device; and
  a processing module, configured to obtain second QoS information according to the first information, wherein the second QoS information is QoS information of the service interaction between the first terminal device and the third terminal device,
  wherein the transceiver module is further configured to transmit the second QoS information to the third terminal device.

According to the fifth aspect, an embodiment of the present disclosure provides a terminal device which is a second terminal device and includes:
  a transceiver module, configured to transmit first information to a first terminal device, wherein the first information is used to request service interaction between the second terminal device and a third terminal device; and
  a processing module, configured to obtain first QoS information, wherein the first QoS information is QoS information of the service interaction between the second terminal device and the first terminal device.

According to the sixth aspect, an embodiment of the present disclosure provides a terminal device which is a third terminal device and includes:
  a transceiver module, configured to receive second QoS information transmitted by a first terminal device, wherein the second QoS information is QoS information for service interaction between the first terminal device and the third terminal device.

According to the seventh aspect, an embodiment of the present disclosure further provides an electronic device including a processor, a memory, and computer program instructions, wherein the memory stores the computer-executable instructions, and wherein the processor is configured to execute the computer-executable instructions stored in the memory, so that the processor executes the QoS control method according to any one of the first aspect.

According to the eighth aspect, an embodiment of the present disclosure further provides an electronic device including a processor, a memory, and computer program instructions, wherein the memory stores the computer-executable instructions, and wherein the processor is configured to execute the computer-executable instructions stored in the memory, so that the processor executes the QoS control method according to any one of the second aspect.

According to the ninth aspect, an embodiment of the present disclosure further provides an electronic device including a processor, a memory, and computer program instructions, wherein the memory stores the computer-executable instructions, and wherein the processor is configured to execute the computer-executable instructions stored in the memory, so that the processor executes the QoS control method according to any one of the third aspect.

According to the tenth aspect, an embodiment of the present disclosure further provides a computer-readable storage medium, wherein computer-executable instructions are stored in the computer-readable storage medium, and when the computer-executable instructions are executed by a processor, are used to implement the QoS control method according to any one of the first aspect.

According to the eleventh aspect, an embodiment of the present disclosure further provides a computer-readable storage medium, wherein computer-executable instructions are stored in the computer-readable storage medium, and when the computer-executable instructions are executed by a processor, are used to implement the QoS control method according to any one of the second aspect.

According to the twelfth aspect, an embodiment of the present disclosure further provides a computer-readable storage medium, wherein computer-executable instructions are stored in the computer-readable storage medium, and when the computer-executable instructions are executed by a processor, are used to implement the QoS control method according to any one of the third aspect.

According to the thirteenth aspect, an embodiment of the present disclosure further provides a program, which, when being executed by a processor, is used to implement the QoS control method according to any one of the first aspect.

According to the fourteenth aspect, an embodiment of the present disclosure further provides a program, which, when being executed by a processor, is used to implement the QoS control method according to any one of the second aspect.

According to the fifteenth aspect, an embodiment of the present disclosure further provides a program, which, when being executed by a processor, is used to implement the QoS control method according to any one of the third aspect.

According to the sixteenth aspect, an embodiment of the present disclosure further provides a program product including program instructions used to implement the QoS control method according to any one of the first aspect.

According to the seventeenth aspect, an embodiment of the present disclosure further provides a program product including program instructions used to implement the QoS control method according to any one of the second aspect.

According to the eighteenth aspect, an embodiment of the present disclosure further provides a program product including program instructions used to implement the QoS control method according to any one of the third aspect.

According to a nineteenth aspect, an embodiment of the present disclosure provides a chip, including a processing module and a communication interface, wherein the processing module may implement the QoS control method according to any one of the first aspect.

Further, the chip further includes a storage module (e.g., a memory), the storage module is used for storing instructions, the processing module is used for executing the instructions stored in the storage module, and the execution of the instructions stored in the storage module causes the processing module to implement the QoS control method according to any one of the first aspect.

According to a twentieth aspect, an embodiment of the present disclosure provides a chip, including a processing module and a communication interface, wherein the processing module may implement the QoS control method according to any one of the second aspect.

Further, the chip further includes a storage module (e.g., a memory), the storage module is used for storing instructions, the processing module is used for executing the instructions stored in the storage module, and the execution of the instructions stored in the storage module causes the processing module to implement the QoS control method according to any one of the second aspect.

According to a twenty-first aspect, an embodiment of the present disclosure provides a chip, including a processing module and a communication interface, wherein the processing module may implement the QoS control method according to any one of the third aspect.

Further, the chip further includes a storage module (e.g., a memory), the storage module is used for storing instructions, the processing module is used for executing the instructions stored in the storage module, and the execution of the instructions stored in the storage module causes the processing module to implement the QoS control method according to any one of the third aspect.

BRIEF DESCRIPTION OF THE DRAWINGS

In order to more clearly illustrate the embodiments of the present disclosure or the technical solutions in the prior art, the following will briefly introduce the accompanying drawings that need to be used in the description of the embodiments or the prior art. It will be apparent that the drawings in the following description are some embodiments of the present disclosure. For those of ordinary skill in the art, other drawings can also be obtained from these drawings without creative effort.

DETAILED DESCRIPTION

The technical solutions in the embodiments of the present disclosure will be clearly and completely described below with reference to the accompanying drawings in the embodiments of the present disclosure, to make the objectives, technical solutions and advantages of the embodiments of the present disclosure clearer. Obviously, the described embodiments are some, but not all, embodiments of the present disclosure. Based on the embodiments in this disclosure, all other embodiments obtained by those of ordinary skill in the art without creative efforts shall fall within the protection scope of this disclosure.

The terms "first", "second" and the like in the description, claims and the above-mentioned drawings of the embodiments of the present disclosure are used to distinguish similar objects, and are not necessarily used to describe a specific sequence or sequence. Furthermore, the terms "comprising" and "having", and any variations thereof, are intended to cover non-exclusive inclusion. For example, a process, method, system, product or device comprising a series of steps or units is not necessarily limited to those steps or units expressly listed, but may include other steps or units not expressly listed or other steps or units inherent to these processes, methods, products or devices.

In the prior art, a UE capable of proximity services (proximity-based services, prose) can establish a PC5 communication link with another UE capable of prose through a PC5 interface, so as to realize direct communication between the two UEs. The two UEs determine the QoS parameters corresponding to the service data transmission according to the QoS requirements of the service, and establish a PC5 QoS data flow between the two UEs that can guarantee the corresponding QoS requirements to transmit the service data. Thus, the data transmission quality of the service interaction through the PC5 communication link is guaranteed.

Figure 1:
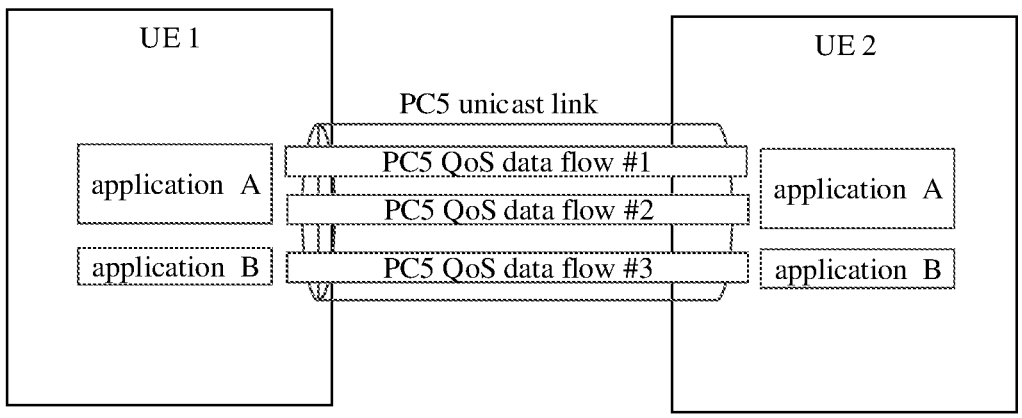
FIG. 1 is a schematic structural diagram of PC5-based unicast link communication according to an embodiment of the present disclosure.

Exemplarily, FIG. 1 is a schematic diagram of an architecture based on PC5 unicast link communication provided by an embodiment of the disclosure. In the scenario shown in FIG. 1, both UE1 and UE2 have the prose capability, and UE1 and UE2 can communicate with each other by establishing the PC5 unicast link with the PC5 interface. Different service data flows have different QoS requirements and are transmitted through different QoS data flows. The UE1 and the UE2 each determine the QoS parameters for exchanging the service data according to the service, so as to ensure the data transmission quality of the service on the PC5 communication link.

Exemplarily, when UE1 and UE2 exchange video services through the PC5 communication link, UE1 and UE2 respectively determine that the transmission delay is 200 ms according to the application layer service identifier obtained from the application layer. It should be noted that the transmission delay referred to here is the transmission delay of the service data of the video service from UE1 to UE2, or the transmission delay of service data of the video service from UE2 to UE1.

Figure 2:
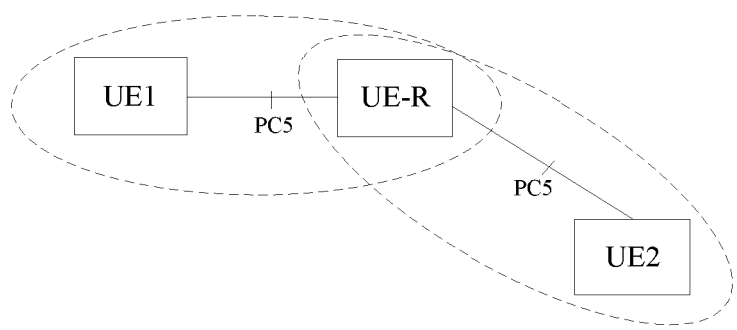
FIG. 2 is a communication scene diagram provided by this disclosure.

In the scenario shown in FIG. 1, when two UEs with the prose capability cannot establish direct communication through the PC5 interface due to a long distance or some other reasons, the communication can be relayed through another UE with the prose capability. The UE used for communication relay is used as a relay node. As shown in FIG. 2, UE-R can directly communicate with UE1 through the PC5 interface, and UE-R can also communicate directly with UE2 through the PC5 interface, that is, UE1 and UE2 can conduct service interaction through UE-R.

If UE1 requests service interaction between UE1 and UE2, UE1 can perform service interaction with UE2 through UE-R. In the prior art, the two terminal devices performing the service interaction each determine the QoS parameters of the service data in the interaction process according to the service. For example, in the scenario shown in FIG. 2 above, UE1 and UE2 each determine QoS parameters corresponding to service data transmission according to the service. That is, UE1 determines the first QoS parameter for the exchange of service data between UE1 and UE-R according to the service, and UE2 determines the second QoS parameter for the exchange of service data between UE2 and UE-R according to the service.

For example, UE1 and UE2 exchange a video service with an end-to-end transmission delay of 200 milliseconds (ms), UE1 determines that the transmission delay between UE1 and UE-R is 200 ms according to the service, and UE2 and UE-R determine that the transmission delay on the PC5 interface is also 200 ms according to the service. Then the actual transmission delay of the service is the sum of the transmission delay between UE1 and UE-R and the transmission delay between UE-R and UE2, that is, the actual transmission delay of the service is 400 ms. This results in that the data transmission quality of the service data transmitted between UE1 and UE2 cannot be guaranteed.

Therefore, the embodiments of the present disclosure provide a QoS control method, in which the source UE transmits request information to the target UE according to the trigger of the application, wherein the request information includes QoS information of service data transmitted between the source UE and the target UE. The relay UE receives the request information initiated by the source UE to the target UE, and can obtain the QoS information of service data transmission between the source UE and the relay UE, and the QoS information of service data transmission between the relay UE and the target UE. Thus, the data transmission quality of the service interaction between the source UE and the target UE through the relay UE is guaranteed.

Before introducing the QoS control method provided by this embodiment, the implementation environment involved in the embodiment of this disclosure is first introduced.

The technical solutions of the embodiments of the present disclosure can be applied to various communication systems, such as: GSM (Global System of Mobile communication) system, CDMA (Code Division Multiple Access) system, WCDMA (Wideband Code Division Multiple Access) system, GPRS (General Packet Radio Service), LTE (Long Term Evolution) system, LTE FDD (Frequency Division Duplex) system, LTE TDD (Time Division Duplex) system, LTE-A (Advanced long term evolution) system, NR (New Radio) system, evolution system of NR system, LTE-U (LTE-Based Access To Unlicensed Spectrum) system, NR-U (NR-Based Access To Unlicensed Spectrum) systems, UMTS (Universal Mobile Telecommunication System), WiMAX (Worldwide Interoperability for Microwave Access) communication systems, WLAN (Wireless Local Area Networks), WiFi (Wireless Fidelity), next-generation communication systems or other communication systems, etc.

Generally speaking, traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication and vehicle to everything (V2X) systems, etc. The embodiments of the present disclosure can also be applied to these communication systems.

It should be noted that the system architecture and service scenarios described in the embodiments of the present disclosure are for the purpose of illustrating the technical solutions of the embodiments of the present disclosure more clearly, and do not constitute a limitation on the technical solutions provided by the embodiments of the present disclosure. It can be seen that, with the evolution of the network architecture and the emergence of new service scenarios, the technical solutions provided in the embodiments of the present disclosure are also applicable to similar technical problems.

Figure 3:
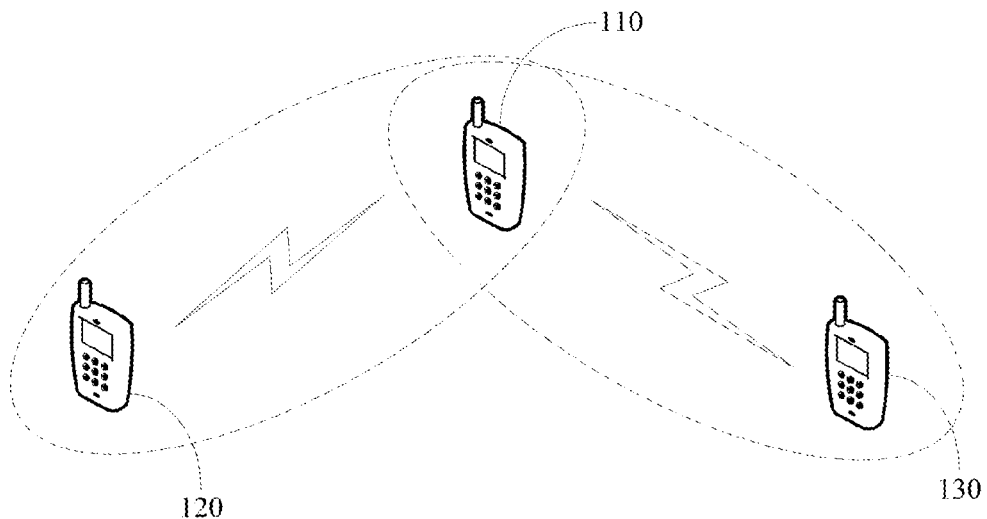
FIG. 3 is an applicable scenario diagram of the QoS control method provided by the present disclosure.

FIG. 3 is an architectural diagram of a communication system to which this application is applied. The communication system 100 shown in FIG. 3 includes: a first terminal device 110, a second terminal device 120 and a third terminal device 130.

The first terminal device 110 (the first terminal device is also referred to as for example the first communication terminal, the first terminal, the first user equipment, the first UE, the UE1, etc.) is a device that can communicate with the second terminal device 120 (the second terminal device is also referred to as for example the second communication terminal, the second terminal, the second user equipment, the second UE, the UE2, etc.) and the third terminal device 130 (the third terminal device is also referred to as for example the third communication terminal, the third terminal, the third user equipment, the third UE, the UE3, etc.).

The first terminal device 110, the second terminal device 120 and the third terminal device 130, as the terminal devices used here, can perform terminal direct connection communication with each other. Exemplarily, the second terminal device 120 may communicate with the third terminal device 130 through the first terminal device 110, or the first terminal device 110 may communicate with the third terminal device 130 through the second terminal device 120. It can be understood that the first terminal device, the second terminal device, and the third terminal device referred to here are relative, and are not limitations on the order of the terminal devices.

Optionally, the "terminal device" as used herein includes, but is not limited to, a device configured to receive/transmit communication signal through a wired line such as public switched telephone networks (PSTN), digital subscriber line (DSL), digital cable, direct cable connections and/or another data connection/network; and/or through wireless interface such as cellular network, wireless local area network (WLAN), digital television network such as DVB-H network, satellite network, AM-FM broadcast transmitter, and/or another terminal device; and/or an Internet of Things (IoT) device. The terminal device configured to communicate via the wireless interface may be referred to as a "wireless communication terminal", "wireless terminal" or "mobile terminal". Examples of mobile terminals include, but are not limited to, a satellite or cellular telephone; a personal communications system (PCS) terminal that may combine cellular radio telephones with data processing, facsimile, and data communications capabilities; a PDA that may include radio telephones, pagers, Internet/Intranet access, web browser, memo pad, calendar, and/or global positioning system (GPS) receiver; and conventional laptop and/or palmtop receivers or other electronic devices including radiotelephone transceiver. The terminal device may refer to an access terminal, user equipment subscriber unit, subscriber station, mobile site, mobile station, remote station, remote terminal, mobile device, user terminal, terminal, wireless communication device, user agent, or user equipment. The access terminal may be a cellular phone, a cordless phone, a session initiation protocol (SIP) phone, a wireless local loop (WLL) station, a personal digital assistant (PDA), a wireless handheld device with communication function, a computing device or other processing device connected to wireless modems, in-vehicle devices, wearable devices, terminal devices in 5G networks or in future evolved PLMNs, etc.

The QoS control method provided by the embodiments of the present disclosure is described in detail below. The QoS control method provided by the present disclosure includes at least part of the following contents.

Figure 4:
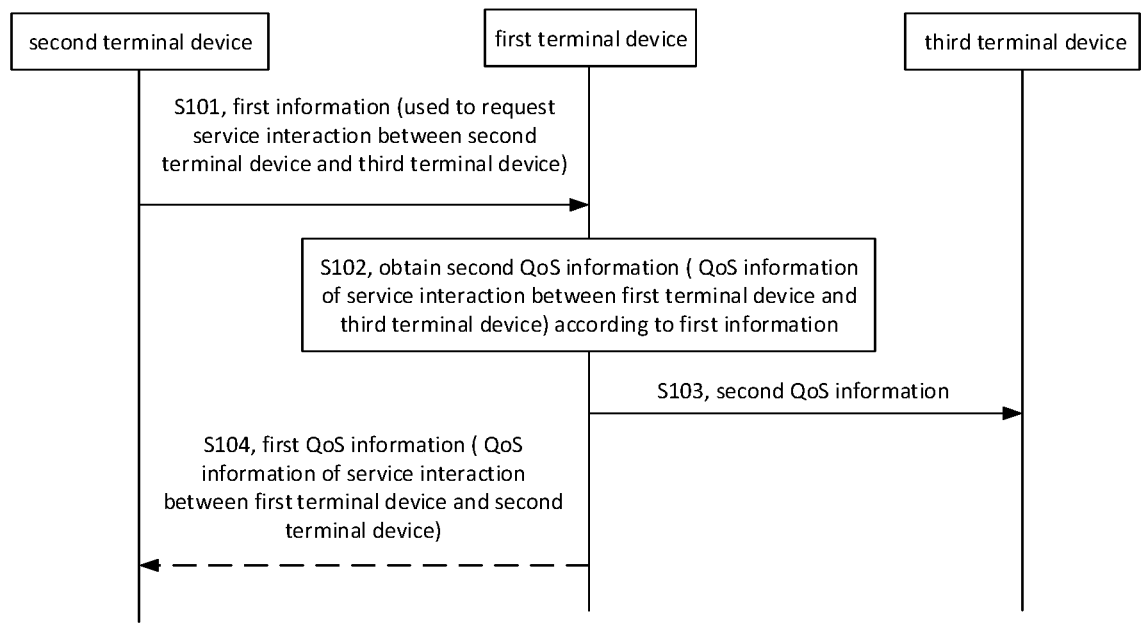
FIG. 4 is a flowchart of a QoS control method provided by an embodiment of the present disclosure.

FIG. 4 is a flowchart of a QoS control method provided by an embodiment of the present disclosure. As shown in FIG. 4, the method of this embodiment includes the followings.

In S101, the second terminal device transmits first information to the first terminal device.

First, it should be noted that the first terminal device, the second terminal device, and the third terminal device all have the prose capability, and a direct communication link cannot be established between the second terminal device and the third terminal device. Therefore, the communication between the second terminal device and the third terminal device needs to be relayed by the first terminal device. That is to say, the service interaction between the second terminal device and the third terminal device needs to be relayed through the first terminal device.

The second terminal device transmits the first information to the first terminal device, and correspondingly, the first terminal device receives the first information transmitted by the second terminal device. Optionally, the second terminal device may transmit the first information in the form of broadcasting, or may also transmit the first information on a communication link established between the second terminal device and the first terminal device. Then, the first terminal device may receive the first information in the form of monitoring the broadcast, or directly on the communication link established by the first terminal device and the second terminal device. The first information is used to request service interaction between the second terminal device and the third terminal device. Optionally, the above-mentioned services include, but are not limited to, video services, text transmission services, image transmission services, audio transmission services, and the like.

In a possible implementation, the first information includes end-to-end QoS information of service interaction between the second terminal device and the third terminal device. The end-to-end QoS information includes, but is not limited to, QoS parameters such as the transmission delay, bandwidth, bit error rate, and service priority of the service data from the second terminal device to the third terminal device, or from the third terminal device to the second terminal device. Optionally, the end-to-end QoS information may be an identifier of the QoS information, or a value of a QoS parameter, or a value range of a QoS parameter.

For example, the first information includes that the end-to-end transmission delay of the video service interaction between the second terminal device and the third terminal device is 200 ms. If the PQI mapping table shown in Table 1 below is preset or standardized, the first information may include the value of PQI, and the end-to-end transmission delay is indicated by the value of PQI. In this embodiment, the PQI (PC5 5QI) represents the PC5 5G QoS identifier.

TABLE 1

| PQI | Service Priority | Delay | Bit Error Rate |
|---|---|---|---|
| 95 | 2 | 200 ms | $10^{-2}$ |
| 58 | 4 | 100 ms | $10^{-2}$ |
| 57 | 5 | 25 ms | $10^{-2}$ |

In another possible implementation, the first information includes end-to-end QoS information of the service interaction between the second terminal device and the third terminal device and the first QoS information, wherein the first QoS information is the QoS information of the service interaction between the first terminal device and the second terminal device. The first QoS information includes, but is not limited to, QoS parameters such as the transmission delay, bandwidth, bit error rate, and service priority of the service data from the second terminal device to the first terminal device, or from the first terminal device to the second terminal device.

Optionally, the end-to-end QoS information may be an identifier of the end-to-end QoS information, or the value of the end-to-end QoS parameter, or the value range of the QoS parameter. The first QoS information may be the identifier of the first QoS information, or the value of the first QoS parameter, or the value range of the QoS parameter.

For example, the first information includes the end-to-end transmission delay of the video service interaction between the second terminal device and the third terminal device, and the transmission delay of the video service interaction between the second terminal device and the first terminal device. For example, the end-to-end transmission delay is 200 ms and the transmission delay between the second terminal device and the first terminal device is 100 ms. If the PQI mapping table shown in Table 1 above is preset or standardized, the first information may include two PQI values, and the two PQI values respectively indicate the end-to-end transmission delay and the transmission delay of the video service interaction between the second terminal device and the first terminal device.

In another possible implementation, the first information includes first QoS information and second QoS information, wherein the first QoS information is QoS information for service interaction between the first terminal device and the second terminal device, and the second QoS information is the QoS information of the service interaction between the first terminal device and the third terminal device. Wherein, the second QoS information includes, but is not limited to, QoS parameters such as transmission delay, bandwidth, bit error rate, and service priority of service interaction between the second terminal device and the first terminal device, and QoS parameters such as transmission delay, bandwidth, bit error rate, and service priority of service interaction between the first terminal device and the third terminal device.

In another possible implementation, the first information includes the first QoS information of the service interaction between the second terminal device and the first terminal device, and the second QoS information of the service interaction between the third terminal device and the first terminal device. Wherein, the first QoS information includes, but is not limited to, QoS parameters such as the transmission delay, bandwidth, bit error rate, and service priority of the service data from the second terminal device to the first terminal device, or from the first terminal device to the second terminal device. Wherein, the second QoS information includes, but is not limited to, QoS parameters such as the transmission delay, bandwidth, bit error rate, and service priority of the service data from the third terminal device to the first terminal device, or from the first terminal device to the third terminal device.

Optionally, the first QoS information may be an identifier of the first QoS information, or a value of the first QoS parameter, or a value range of the QoS parameter. The second QoS information may be the identifier of the second QoS information, or the value of the second QoS parameter, or the value range of the QoS parameter.

For example, the end-to-end transmission delay requirement for video service interaction between the second terminal device and the third terminal device is 200 ms, and the transmission delay requirement for video service interaction between the second terminal device and the first terminal device is 100 ms, and the transmission delay requirement of the video service interaction between the first terminal device and the third terminal device is 100 ms. Then the first information may include that the first QoS information is 100 ms, and the second QoS information is 100 ms. If the PQI mapping table shown in Table 1 above is preset or standardized, the first information may include two PQI values, and the two PQI values respectively indicate the transmission delay of the video service interaction between the second terminal device and the first terminal device, and the transmission delay of the video service interaction between the first terminal device and the third terminal device.

In S102, the first terminal device obtains second QoS information according to the first information.

Specifically, after receiving the first information, the first terminal device may obtain, according to the first information, QoS information of service interaction between the first terminal device and the third terminal device, that is, the second QoS information.

In some cases, the first information includes end-to-end QoS information, then the first terminal device firstly obtains the QoS information of the service interaction between the first terminal device and the second terminal device, that is, the first QoS information, and obtains the second QoS information according to the end-to-end QoS information and the first QoS information. The first terminal device can obtain the first QoS information and the second QoS information in the above manner, and the first QoS information and the second QoS information jointly satisfy the above-mentioned end-to-end QoS information.

Optionally, the obtaining of the first QoS information by the first terminal device may be implemented in the following manner.

In a possible implementation, the first terminal device may obtain the first QoS information according to the signal transmission quality between the first terminal device and the second terminal device. Exemplarily, the first terminal device obtains the first QoS information by performing relevant calculations such as wireless power or path loss according to the relevant information measured by the wireless signal. The relevant information of the wireless signal measurement may be obtained by performing wireless signal measurement after receiving the first information, or may be a relevant measurement result obtained during the establishment of the communication link between the first terminal device and the second terminal device. Alternatively, the relevant information may also be related information of wireless signal measurement used when obtaining the first QoS information during last service interaction process between the first terminal device and the second terminal device, which is not limited in this embodiment of the present disclosure. The relevant information of the wireless signal measurement only needs to be able to reflect the signal transmission quality when the first terminal device and the second terminal device perform the service requested by the first information in the current state.

In another possible implementation, the first terminal device obtains the first QoS information according to the timestamp carried in the first information and the current time. The time stamp carried in the first information is the time at which the second terminal device transmits the first information, and the time stamp may also be referred to as time tag, transmission time, etc. That is, the first terminal device can obtain the length of duration that the first information is transmitted from the second terminal device to the first terminal device by comparing the time stamp carried by the first information with the current time, thereby obtaining the QoS information of the service interaction between the first terminal device and the second terminal device.

In another possible implementation, the first information includes the first QoS information. For example, the first information includes the end-to-end QoS information and the first QoS information, and the first terminal device can directly obtain the first QoS information from the first information.

In other cases, the first information includes the first QoS information and the second QoS information, and the first terminal device may obtain the first QoS information and the second QoS information from the first information.

It should be noted that, in the above several possible implementations, the obtained first QoS information may be the value of the QoS parameter, or may be the value range supported by the QoS parameter, which is not limited in this embodiment of the present disclosure.

In S103, the first terminal device transmits the second QoS information to the third terminal device.

The first terminal device transmits the second QoS information to the third terminal device, and correspondingly, the third terminal device receives the second QoS information transmitted by the first terminal device, thereby obtaining the QoS information of the service interaction between the first terminal device and the third terminal device.

It should be noted that, if the first QoS information is the value range of the QoS parameter, correspondingly, the second QoS information may also be the value range of the QoS parameter. The first terminal device transmits the value range of the second QoS parameter to the third terminal device, and the third terminal device may determine the value of the second QoS parameter according to the value range of the second QoS parameter.

In this embodiment, the second terminal device transmits the first information to the first terminal device for requesting service interaction between the second terminal device and the third terminal device; and the first terminal device obtains the QoS information of the service interaction between the first terminal device and the third terminal device according to the first information, and transmits the second QoS information the third terminal device. In the above manner, the first terminal device and the third terminal device can obtain the QoS information of the service interaction between the first terminal device and the third terminal device, that is, the second QoS information, and the second QoS information can satisfy the end-to-end QoS information, thereby ensuring the data transmission quality of service transmission between the second terminal device and the third terminal device. In addition, the first terminal device can obtain the first QoS information of the service interaction between the first terminal device and the second terminal device, and use the first QoS information and the second QoS information to jointly ensure the data transmission quality of the service data of the service transmitted between the second terminal device and the third terminal device.

On the basis of the embodiment shown in FIG. 4, in the case that the first information includes end-to-end QoS information and the first QoS information, or the first information includes the first QoS information and the second QoS information, after the first terminal transmits the second QoS information to the third terminal device, the third terminal device determines that there is no need to update the second QoS information. At this time, the first terminal device can directly obtain the first QoS information according to the first information, and the second terminal device can also obtain the first QoS information. Then, by executing the above S101 to S103, the second terminal device, the first terminal device and the third terminal device can all obtain the corresponding QoS information, thereby ensuring the data transmission quality of the service data of the service interacted between the second terminal device and the third terminal device through the first terminal device.

In the case where the first information includes the end-to-end QoS information but does not include the first QoS information, after the first terminal device transmits the second QoS information to the third terminal device, the third terminal device determines that it is not necessary to update the second QoS information. At this time, the second terminal device cannot determine the first QoS information. Therefore, the first terminal device needs to indicate the first QoS information to the second terminal device. In addition, if it is preset, no matter what parameters the first information includes, the first terminal device will indicate the first QoS information and the second QoS information to the second terminal device and the third terminal device respectively, thus regardless of whether the second terminal device can determine the first QoS information, the first terminal device needs to indicate the first QoS information to the second terminal device.

Therefore, optionally, on the basis of the embodiment shown in FIG. 4, the method may also include the following.

In S104, the first terminal device transmits the first QoS information to the second terminal device.

In this embodiment, the first QoS information is obtained by the first terminal device, and the first QoS information is indicated to the second terminal device, so that the first terminal device can obtain the QoS information of the service interaction between the first terminal device and the second terminal device, so as to ensure the service quality of the service interacted between the second terminal device and the third terminal device through the first terminal device.

Figure 5:
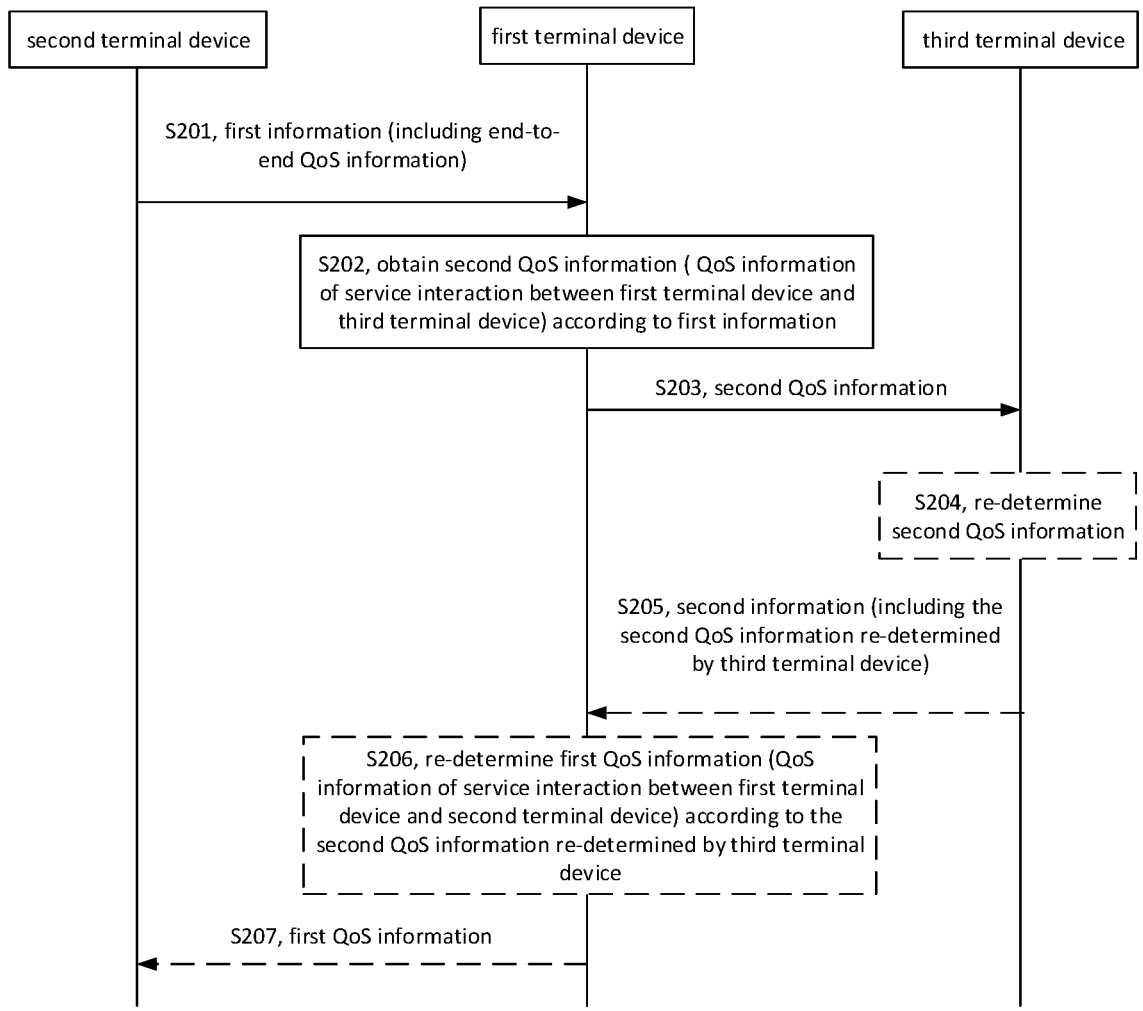
FIG. 5 is a flowchart of a QoS control method provided by another embodiment of the present disclosure.

FIG. 5 is a flowchart of a QoS control method provided by another embodiment of the present disclosure. As shown in FIG. 5, the method of this embodiment includes the following.

In S201, the second terminal device transmits first information to the first terminal device, wherein the first information includes end-to-end QoS information.

In S202, the first terminal device obtains second QoS information according to the first information.

In S203, the first terminal device transmits the second QoS information to the third terminal device.

S201 to S203 in this embodiment may be similar to S101 to S103 in the embodiment shown in FIG. 4, and reference may be made to the detailed description of the embodiment shown in FIG. 4, which will not be repeated here.

In some cases, after the first terminal device transmits the second QoS information to the third terminal device, and the third terminal device determines that the second QoS information needs to be updated, the second QoS information and the first QoS information need to be re-determined. Therefore, in such a case, after S203, S204 to S207 can be performed.

In S204, the third terminal device re-determines the second QoS information.

Exemplarily, the third terminal device may re-determine the second QoS information according to one or more of information such as a preconfigured data transmission policy, the data processing capability of the third terminal device, data transmission capability, and application-related configuration information. QoS information.

Exemplarily, if the first terminal device transmits to the third terminal device the value range of the second QoS parameter, the third terminal device may determine the value of the second QoS parameter according to the value range of the second QoS parameter, and this process is to re-determine the second QoS information.

For example, the end-to-end transmission delay of the video service interacted between the second terminal device and the third terminal device is 200 ms, and the first terminal device determines that the first transmission delay of the video service interaction between the first terminal device and the second terminal device is in the range of [100,175] ms, then the first terminal device determines that the second transmission delay of the video service interaction between the first terminal device and the third is [25,100] ms, according to the range of the first transmission delay [100, 175] ms and the end-to-end transmission delay of 200 ms. Thus the first terminal device transmits the range of the second transmission delay [25,100] ms to the third terminal device. The third terminal device re-determines the second transmission delay to be 100 ms according to the range of the second transmission delay [25,100] ms.

Alternatively, if the third terminal device determines that the second QoS parameter transmitted by the first terminal device is not applicable, the value of the second QoS parameter needs to be updated, and the second QoS information is re-determined. For example, the end-to-end transmission delay of the video service interacted between the second terminal device and the third terminal device is 200 ms, and the first terminal device determines that the first transmission delay of the video service interaction between the first terminal device and the second terminal device is 100 ms, then the first terminal device determines that the second transmission delay of the video service interaction between the first terminal device and the third is 100 ms, according to the range of the first transmission delay 100 ms and the end-to-end transmission delay of 200 ms. Thus the first terminal device transmits the second transmission delay 100 ms to the third terminal device. The third terminal device determines that the second transmission delay of 100 ms cannot be satisfied, and then re-determines that the second transmission delay is 120 ms.

It should be noted that the embodiment of the present disclosure does not limit the specific implementation manner of the third terminal device re-determining the second QoS information.

In S205, the third terminal device transmits second information to the first terminal device, wherein the second information includes second QoS information re-determined by the third terminal device.

Correspondingly, the first terminal device receives the second information transmitted by the third terminal device, thereby obtaining the second QoS information re-determined by the third terminal device. For example, the first terminal device may transmit the second QoS information in the form of broadcasting, or the first terminal device may also transmit the second QoS information on the communication link that has been established with the third terminal device, but the embodiment of the present disclosure is not limited to transmitting the second QoS information through the above two methods.

In S206, the first terminal device re-determines the first QoS information according to the second QoS information re-determined by the third terminal device.

In S207, the first terminal device transmits the first QoS information to the second terminal device.

Specifically, the third terminal device re-determines the second QoS information, and transmits the re-determined second QoS information to the first terminal device. The first terminal device receives the re-determined second QoS information transmitted by the third terminal device, and re-determines the first QoS information according to the re-determined second QoS information; and the first terminal device transmits the re-determined first QoS information to the second terminal device.

Referring to the example in S204, if the first terminal device determines that the first transmission delay of the video service interaction between the first terminal device and the second terminal device is in the range of [100,175] ms, the second transmission delay of the video service interaction between the first terminal device and the third terminal device is in the range of [25,100] ms, and the re-determined second transmission delay received by the first terminal device from the third terminal device is 100 ms, then the first terminal device can re-determine the first transmission delay as 100 ms according to the second transmission delay of 100 ms re-determined by the third terminal device, and transmit the re-determined first transmission delay as 100 ms to the second terminal device.

If the first terminal device determines that the first transmission delay of the video service interaction between the first terminal device and the second terminal device is 100 ms, the second transmission delay of the video service interaction between the first terminal device and the third terminal device is 100 ms, and the second transmission delay re-determined by the third terminal device is 120 ms, then the first terminal device re-determines that the first transmission delay is 80 ms according to the second transmission delay of 120 ms re-determined by the third terminal device, and transmit the re-determined first transmission delay of 80 ms to the second terminal device.

In this embodiment, the third terminal device re-determines the second QoS information and transmits the re-determined second QoS information to the first terminal device, so that the first terminal device obtains the QoS information of the service between the first terminal device and the third terminal device. In addition, the first terminal device re-determines the first QoS information according to the second QoS information re-determined by the third terminal device, and transmits the re-determined first QoS information to the second terminal device, so that the second terminal device obtains the re-determined first QoS information. Through the re-determined first QoS information and the re-determined second QoS information, it is ensured that the service interaction between the second terminal device and the third terminal device can meet the end-to-end QoS requirements, and the service quality of the service is guaranteed.

The following describes in detail according to three cases that the first information includes the end-to-end QoS information, or the end-to-end QoS information and the first QoS information, or the first QoS information and the second QoS information. In all of the following several embodiments for example, the second terminal device requesting to perform a video service between the second terminal device and the third terminal device is taken as an example for description. In the video service interaction, the end-to-end QoS information between the second terminal device and the third terminal device includes transmission delay, and the end-to-end transmission delay is 200 ms.

Figure 6:
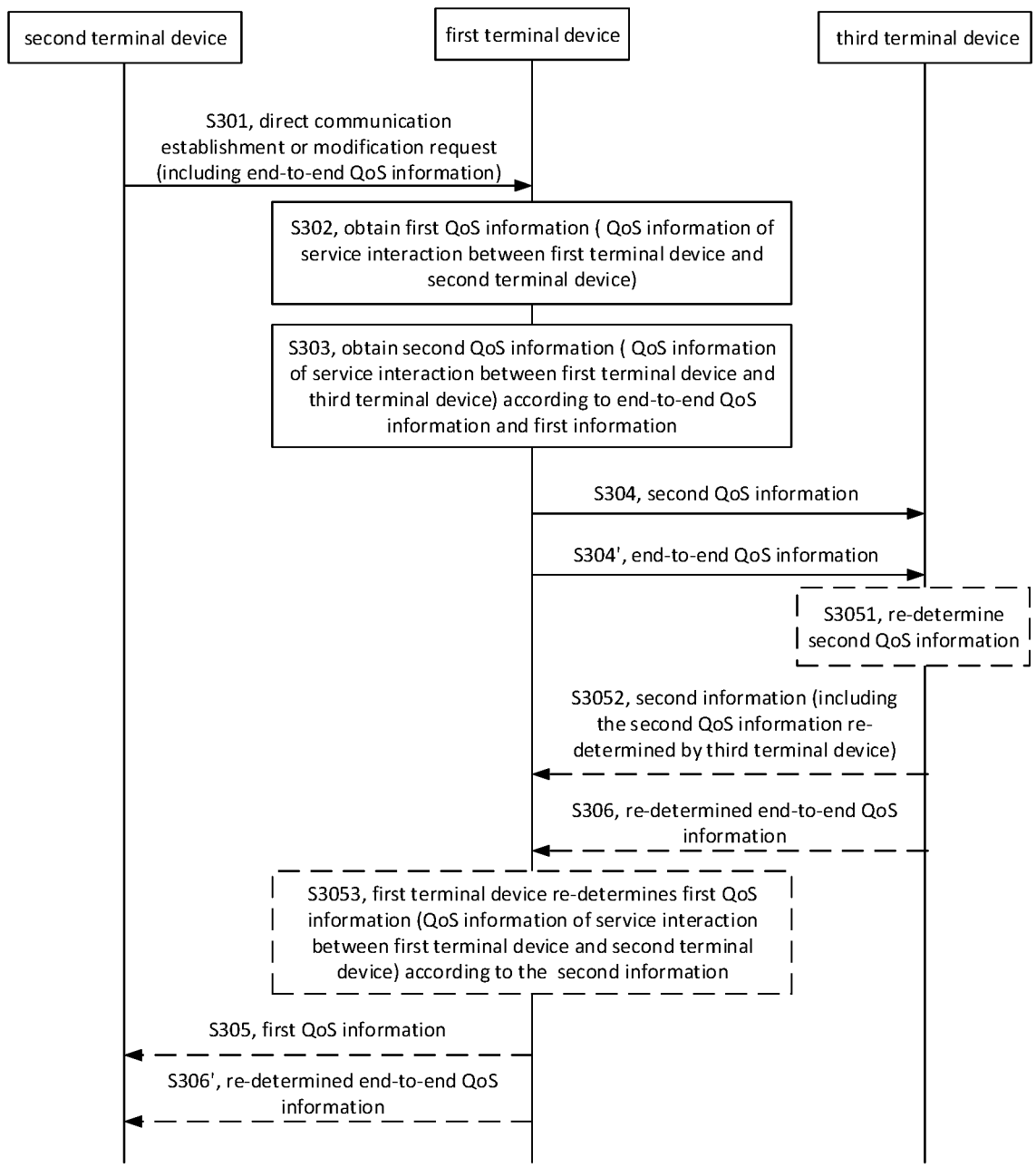
FIG. 6 is a flowchart of a QoS control method provided by another embodiment of the present disclosure.

FIG. 6 is a flowchart of a QoS control method provided by another embodiment of the present disclosure. In this embodiment, the first information includes end-to-end QoS information. As shown in FIG. 6, the method of this embodiment includes the following.

In S301, the second terminal device transmits direct communication establishment or modification request information to the first terminal device, wherein the direct communication establishment or modification request information includes end-to-end QoS information.

Specifically, the second terminal device determines the end-to-end QoS information of the initiated service according to the trigger of the application, and initiates a direct communication establishment or modification request targeting the PC5 connection of the third terminal device. In this embodiment, the direct communication establishment or modification request information is the first information in the foregoing embodiments, and the direct communication establishment or modification request information includes end-to-end QoS information.

In the embodiment, the second terminal device may transmit the direct communication establishment or modification request information in the form of broadcasting, or may also transmit the direct communication establishment or modification request information on the communication link that the second terminal device has established with the first terminal device, which is not limited by the embodiment of the present disclosure.

For example, the pre-configured or standardized PQI mapping is shown in Table 1 above, then the second terminal device can provide PQI=95 indicating that the delay requirement of the end-to-end transmission delay is 200 ms. Of course, the specific QoS parameter may not be the PQI, but may be directly expressed as the delay requirement of the end-to-end transmission delay of 200 ms or other parameters that can be mapped.

In S302, the first terminal device obtains the first QoS information.

The first QoS information obtained by the first terminal device may be a specific value of a QoS parameter, a value range of a QoS parameter, or a PQI value.

In this embodiment, if the direct communication establishment or modification request information includes end-to-end QoS information, the first terminal device can obtain the first QoS information through the relevant information of wireless measurement, or, obtain the first QoS information according to the timestamp carried by the direct communication establishment or modification request information and the current time. For details, reference may be made to the detailed description of the case where the first information includes end-to-end QoS information in the embodiment shown in FIG. 4, which is not repeated here.

In S303, the first terminal device obtains the second QoS information according to the end-to-end QoS information and the first QoS information.

In S304, the first terminal device transmits the second QoS information to the third terminal device.

Correspondingly, the third terminal device receives the second QoS information transmitted by the first terminal device. For example, the first terminal device may transmit the second QoS information in the form of broadcasting, or the first terminal device may also transmit the second QoS information on the communication link that has been established with the third terminal device, but the embodiment of the present disclosure is not limited to transmitting the second QoS information through the above two methods.

In this embodiment, the second terminal device transmits, to the first terminal device, direct communication establishment or modification request information for requesting service interaction between the second terminal device and the third terminal device. The first terminal device obtains the second QoS information for service interaction between the first terminal device and the third terminal device according to the direct communication establishment or modification request information, and transmits the second QoS information to the third terminal device. In the above manner, the first terminal device and the third terminal device can obtain the QoS information of the service interaction between the first terminal device and the third terminal device, that is, the second QoS information. The second QoS information can satisfy the end-to-end QoS information, thereby ensuring the data transmission quality of service transmitted between the second terminal device and the third terminal device. In addition, the first terminal device can obtain the first QoS information of the service interaction between the first terminal device and the second terminal device, and use the first QoS information and the second QoS information to jointly ensure the data transmission quality of the service data of the service transmitted between the second terminal device and the third terminal device.

Optionally, in this embodiment, step S304' may also be included.

In, S304', the first terminal device transmits end-to-end QoS information to the third terminal device.

Correspondingly, the third terminal device receives the end-to-end QoS information transmitted by the first terminal device. For example, when the third terminal device determines that the second QoS information needs to be re-determined, the end-to-end QoS information can provide a corresponding basis for the third terminal device.

The S304 and S304' may be transmitted through the same information, or may be transmitted through different information, and the execution of S304 and the execution of S304' have no particular order.

In S305, the first terminal device transmits the first QoS information to the second terminal device.

Correspondingly, the second terminal device receives the first QoS information transmitted by the first terminal device, so as to obtain the QoS information of the service interaction between the first terminal device and the second terminal device.

It should be noted that, in some cases, the execution order of S305 and S303 is not sequential.

For example, after the first terminal device transmits the second QoS information to the third terminal device, if the third terminal device does not need to update the second QoS information, in this case, the first terminal device also does not need to update the first QoS information, and can transmit the first QoS information to the second terminal device after obtaining the first QoS information. Therefore, the execution order of S305 and S303 can be in no particular order.

For example, assuming that the end-to-end transmission delay of the video service interaction between the second terminal device and the third terminal device is 200 ms, the transmission delay of the video service interaction between the second terminal device and the first terminal device is 100 ms, that is, the first QoS information is 100 ms, and the transmission delay of the video service interaction between the first terminal device and the third terminal device is 100 ms, that is, the second QoS information is 100 ms. After receiving the second QoS information transmitted by the first terminal device, the third terminal device determines that there is no need to update the second QoS information. Then, the second terminal device, the first terminal device, and the third terminal device transmit the video service data according to the first QoS information and the second QoS information, thereby ensuring the data transmission quality of the video service data between the second terminal device and the third terminal device.

In other cases, after the first terminal device transmits the second QoS information to the third terminal device, the third terminal device determines that the second QoS information needs to be updated. Then, feedback information is transmitted to the first terminal device, so as to transmit the second QoS information re-determined by the third terminal device to the first terminal device. Therefore, in such a case, the first terminal device obtains the re-determined second QoS information returned by the third terminal device, and re-determines the first QoS information according to the re-determined second QoS information. Therefore, optionally, before S305, it also includes the following.

In S3051, the third terminal device re-determines the second QoS information.

Exemplarily, the third terminal device may re-determine the second QoS information according to one or more items of information such as a preconfigured data transmission policy, the data processing capability, data transmission capability, and application-related configuration information of the third terminal device.

It should be noted that, the embodiment of the present disclosure does not limit the specific implementation manner of re-determining the second QoS information by the third terminal device.

In S3052, the third terminal device transmits second information to the first terminal device, wherein the second information includes the second QoS information re-determined by the third terminal device.

In S3053, the first terminal device re-determines the first QoS information according to the second information.

In this embodiment, the first terminal device updates the first QoS information according to the second QoS information re-determined by the third terminal device, so as to re-determine the first QoS information. Correspondingly, in S305, the first terminal device transmits the first QoS information re-determined by the first terminal device to the second terminal device.

Exemplarily, the first terminal device may re-determine the first QoS information according to the end-to-end QoS information and the second QoS information re-determined by the third terminal device, thereby ensuring that the re-determined second QoS information and the re-determined first QoS information jointly satisfy the end-to-end QoS information.

For example, assuming that the end-to-end transmission delay of the video service interaction between the second terminal device and the third terminal device is 200 ms, the first transmission delay of the video service interaction between the second terminal device and the first terminal device is 100 ms, that is, the first QoS information is 100 ms, and the second transmission delay of the video service interaction between the first terminal device and the third terminal device is 100 ms, that is, the second QoS information is 100 ms. After receiving the second QoS information transmitted by the first terminal device, the third terminal device determines that the second QoS information needs to be updated. The re-determined transmission delay is, for example, 120 ms, the third terminal device transmits the re-determined second QoS information (that is, the re-determined second transmission delay of 120 ms) to the first terminal device. The first terminal device re-determines the first QoS information according to the re-determined second QoS information (that is, the re-determined second transmission delay of 120 ms) and the end-to-end QoS information (that is, the end-to-end transmission delay of 200 ms). The re-determined first QoS information may be 80 ms (that is, the re-determined first transmission delay is 80 ms). The first terminal device transmits the re-determined first QoS information (that is, the re-determined first transmission delay of 80 ms) to the second terminal device. The second terminal device, the first terminal device, and the third terminal device transmit service data according to the re-determined first QoS information and the re-determined second QoS information, so as to ensure the data transmission quality of the service data between the second terminal device and the third terminal device.

In this embodiment, the third terminal device re-determines the second QoS information and transmits the re-determined second QoS information to the first terminal device, so that the first terminal device obtains the QoS information of the service between the first terminal device and the third terminal device. In addition, the first terminal device re-determines the first QoS information according to the second QoS information re-determined by the third terminal device, and transmits the re-determined first QoS information to the second terminal device, so that the second terminal device obtains the re-determined first QoS information. Through the re-determined first QoS information and the re-determined second QoS information, it is ensured that the service interaction between the second terminal device and the third terminal device can meet the end-to-end QoS requirements, and the data transmission quality of the service is guaranteed.

Optionally, on the basis of the embodiment shown in FIG. 6, it can also include the following.

In S306, the third terminal device transmits the re-determined end-to-end QoS information to the first terminal device.

Correspondingly, the first terminal device receives the re-determined end-to-end QoS information transmitted by the third terminal device.

Exemplarily, the third terminal device may re-determine the end-to-end QoS information according to the received end-to-end QoS information and the re-determined second QoS information. For example, the third terminal device may re-determine the end-to-end QoS information according to one or more items of information such as a preconfigured data transmission policy, the data processing capability of the third terminal device, data transmission capability, and application-related configuration information, the received end-to-end QoS information and the re-determined second QoS information.

It should be noted that the embodiment of the present disclosure does not limit the specific implementation manner of re-determining the end-to-end QoS information by the third terminal device.

Accordingly, in the case where the third terminal device does not transmit the re-determined end-to-end QoS information to the first terminal device, the first terminal device may re-determine the first QoS information according to the original end-to-end QoS information and the re-determined second QoS information. If in the case where the third terminal device transmits the re-determined end-to-end QoS information to the first terminal device, the first terminal device may re-determine the first QoS information according to the re-determined end-to-end QoS information and the re-determined second QoS information transmitted by the third terminal device.

In S306', the first terminal device transmits the re-determined end-to-end QoS information to the second terminal device.

By re-determining the second QoS information and the first QoS information in this embodiment of the present disclosure, the transmission of service data between the second terminal device, the first terminal device, and the third terminal device is more closely related to the actual situation of each terminal device, thereby guaranteeing the reliability of service data transmission.

Figure 7:
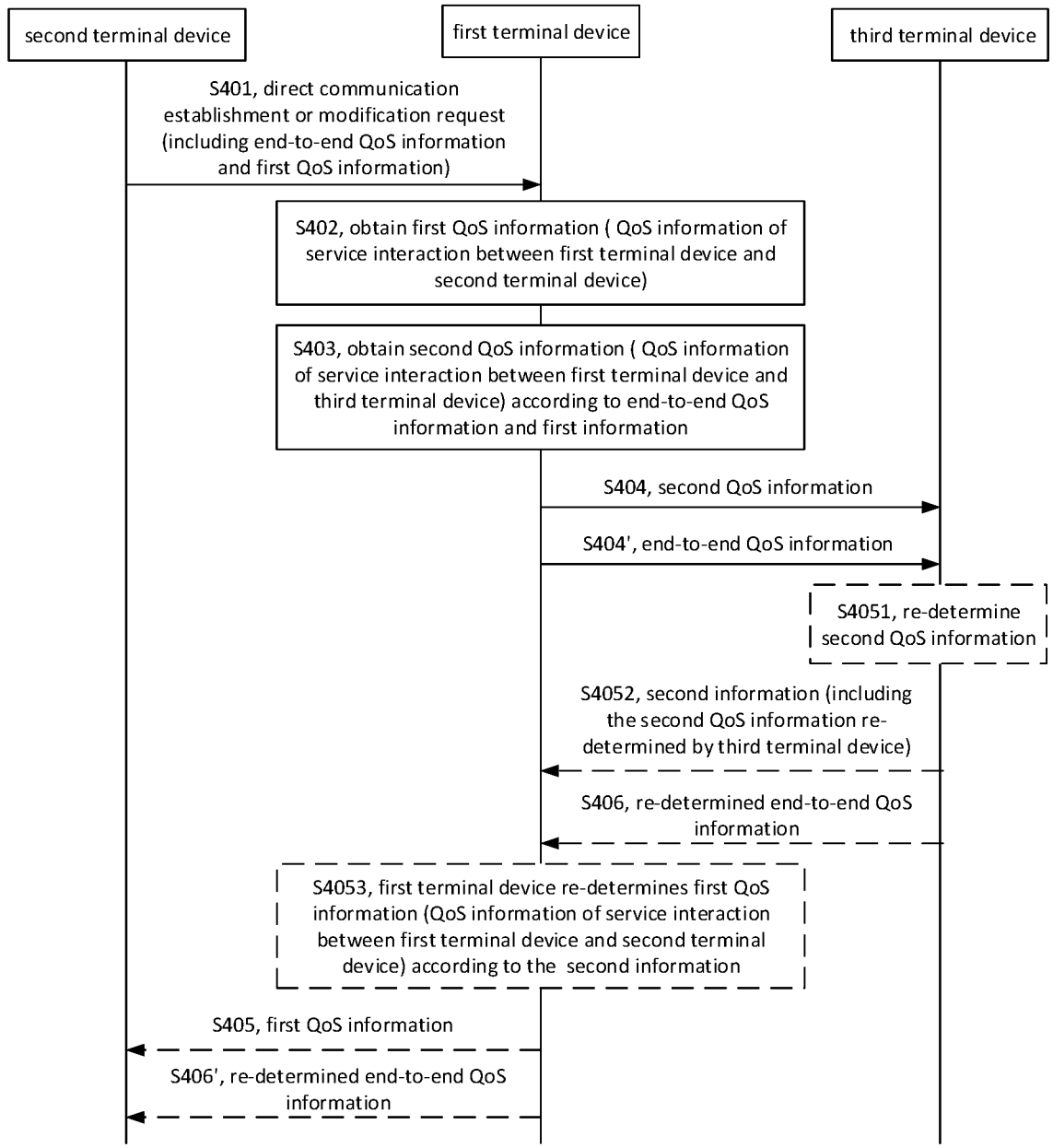
FIG. 7 is a flowchart of a QoS control method provided by another embodiment of the present disclosure.

FIG. 7 is a flowchart of a QoS control method provided by another embodiment of the present disclosure. In this embodiment, the first information includes end-to-end QoS information and first QoS information. As shown in FIG. 7, the method of this embodiment includes the following.

In S401, the second terminal device transmits direct communication establishment or modification request information to the first terminal device, wherein the direct communication establishment or modification request information includes end-to-end QoS information and first QoS information.

This step is similar to step S301 in the embodiment shown in FIG. 6, the detailed description in FIG. 6 can be referred to, and the difference is only in the following two points: 1. the information included in the direct communication establishment or modification request information is different; and 2. the second terminal device determines, according to the end-to-end QoS information, first QoS information for service interaction between the first terminal device and the second terminal device.

It should be noted that, in this embodiment, the second terminal device may also transmit a set of PQI values to the first terminal device to represent the end-to-end QoS information and the first QoS information respectively. For example, the second terminal device transmits PQI=[95, 58] to the first terminal device to indicate that the end-to-end transmission delay is 200 ms and the first transmission delay is 100 ms, respectively. Of course, the second terminal device may also directly indicate that the end-to-end transmission delay is 200 ms and the first transmission delay is 100 ms, or other mappable parameters.

In S402, the first terminal device obtains the first QoS information according to the direct communication establishment or modification request information.

Specifically, the first terminal device may directly obtain the first QoS information according to the direct communication establishment or modification request information. The difference between this embodiment and the embodiment shown in FIG. 6 is: after receiving the direct communication establishment or modification request information, the first terminal device may directly obtain the first QoS information through the direct communication establishment or modification request information, and there is no need to perform the calculation according to the relevant information of the wireless signal measurement or the time stamp carried by the direct communication establishment or modification request information, thereby improving the processing efficiency of the first terminal device.

In S403, the first terminal device obtains the second QoS information according to the end-to-end QoS information and the first QoS information.

In S404, the first terminal device transmits the second QoS information to the third terminal device.

S403 to S404 in this embodiment are respectively similar to S303 to S304 in the embodiment shown in FIG. 6, reference may be made to the detailed description in the embodiment shown in FIG. 6, and details are not repeated here.

In this embodiment, the second terminal device transmits, to the first terminal device, direct communication establishment or modification request information for requesting service interaction between the second terminal device and the third terminal device. The first terminal device obtains the second QoS information for service interaction between the first terminal device and the third terminal device according to the direct communication establishment or modification request information, and transmits the second QoS information to the third terminal device. In the above manner, the first terminal device and the third terminal device can obtain the QoS information of the service interaction between the first terminal device and the third terminal device, that is, the second QoS information. The second QoS information can satisfy the end-to-end QoS information, thereby ensuring the data transmission quality of service transmitted between the second terminal device and the third terminal device. In addition, the first terminal device can obtain the first QoS information of the service interaction between the first terminal device and the second terminal device, and use the first QoS information and the second QoS information to jointly ensure the data transmission quality of the service data of the service transmitted between the second terminal device and the third terminal device. In addition, the first terminal device does not need to perform calculation according to the relevant information of the wireless signal measurement or the time stamp carried by the direct communication establishment or modification request information, thereby improving the processing efficiency of the first terminal device.

Optionally, in this embodiment, it may also include the following.

In, S404', the first terminal device transmits end-to-end QoS information to the third terminal device.

Correspondingly, the third terminal device receives the end-to-end QoS information transmitted by the first terminal device. For example, when the third terminal device determines that the second QoS information needs to be re-determined, the end-to-end QoS information can provide a corresponding basis for the third terminal device.

The S404 and S404' may be transmitted through the same information, or may be transmitted through different information, and the execution of S404 and the execution of S404' have no particular order.

In S405, the first terminal device transmits the first QoS information to the second terminal device.

Correspondingly, the second terminal device receives the first QoS information transmitted by the first terminal device, so as to obtain the first QoS information of the service interaction between the first terminal device and the second terminal device.

It should be noted that, in some cases, if it is preset that the first terminal device and the second terminal device respectively determine the QoS information of the service interaction between the first terminal device and the second terminal device according to the first QoS information, there is no need to perform S405.

In other cases, if the first QoS information indicated by the first terminal device is preset as the QoS information for data transmission, S405 needs to be performed. In addition, the execution order of S405 and S403 may be in no particular order.

For example, after the first terminal device transmits the second QoS information to the third terminal device, if the third terminal device does not need to update the second QoS information, in this case, the first terminal device also does not need to update the first QoS information, and can transmit the first QoS information to the second terminal device after obtaining the first QoS information. Therefore, the execution order of S405 and S403 can be in no particular order.

For example, assuming that the end-to-end transmission delay of the video service interaction between the second terminal device and the third terminal device is 200 ms, the transmission delay of the video service interaction between the second terminal device and the first terminal device is 100 ms, that is, the first QoS information is 100 ms, and the transmission delay of the video service interaction between the first terminal device and the third terminal device is 100 ms, that is, the second QoS information is 100 ms. After receiving the second QoS information transmitted by the first terminal device, the third terminal device determines that there is no need to update the second QoS information. Then, the second terminal device, the first terminal device, and the third terminal device transmit the video service data according to the first QoS information and the second QoS information, thereby ensuring the data transmission quality of the video service data between the second terminal device and the third terminal device.

In other cases, after the first terminal device transmits the second QoS information to the third terminal device, the third terminal device determines that the second QoS information needs to be updated. Then, feedback information is transmitted to the first terminal device, so as to transmit the second QoS information re-determined by the third terminal device to the first terminal device. Therefore, in such a case, the first terminal device obtains the re-determined second QoS information returned by the third terminal device, and re-determines the first QoS information according to the re-determined second QoS information. Therefore, optionally, before S405, it also includes the following.

In S4051, the third terminal device re-determines the second QoS information.

Exemplarily, the third terminal device may re-determine the second QoS information according to one or more items of information such as a preconfigured data transmission policy, the data processing capability, data transmission capability, and application-related configuration information of the third terminal device.

It should be noted that, the embodiment of the present disclosure does not limit the specific implementation manner of re-determining the second QoS information by the third terminal device.

In S4052, the third terminal device transmits second information to the first terminal device, wherein the second information includes the second QoS information re-determined by the third terminal device.

In S4053, the first terminal device re-determines the first QoS information according to the second information.

In this embodiment, the first terminal device updates the first QoS information according to the second QoS information re-determined by the third terminal device, so as to re-determine the first QoS information. Correspondingly, in S405, the first terminal device transmits the first QoS information re-determined by the first terminal device to the second terminal device. Exemplarily, the first terminal device may re-determine the first QoS information according to the end-to-end QoS information and the second QoS information re-determined by the third terminal device, thereby ensuring that the re-determined second QoS information and the re-determined first QoS information jointly satisfy the end-to-end QoS information.

For example, assuming that the end-to-end transmission delay of the video service interaction between the second terminal device and the third terminal device is 200 ms, the transmission delay of the video service interaction between the second terminal device and the first terminal device is 100 ms, that is, the first QoS information is 100 ms, and the transmission delay of the video service interaction between the first terminal device and the third terminal device is 100 ms, that is, the second QoS information is 100 ms. After receiving the second QoS information transmitted by the first terminal device, the third terminal device determines that the second QoS information needs to be updated. The re-determined second QoS information is, for example, 120 ms, the third terminal device transmits the re-determined second QoS information (120 ms) to the first terminal device. The first terminal device re-determines the first QoS information according to the re-determined second QoS information (120 ms) and the end-to-end QoS information (200 ms). The re-determined first QoS information is 80 ms. The first terminal device transmits the re-determined first QoS information (80 ms) to the second terminal device. The second terminal device, the first terminal device, and the third terminal device transmit service data according to the re-determined first QoS information and the re-determined second QoS information, so as to ensure the data transmission quality of the service data between the second terminal device and the third terminal device.

In this embodiment, the third terminal device re-determines the second QoS information and transmits the re-determined second QoS information to the first terminal device, so that the first terminal device obtains the QoS information of the service between the first terminal device and the third terminal device. In addition, the first terminal device re-determines the first QoS information according to the second QoS information re-determined by the third terminal device, and transmits the re-determined first QoS information to the second terminal device, so that the second terminal device obtains the re-determined first QoS information. Through the re-determined first QoS information and the re-determined second QoS information, it is ensured that the service interaction between the second terminal device and the third terminal device can meet the end-to-end QoS requirements, and the data transmission quality of the service is guaranteed.

Optionally, on the basis of the embodiment shown in FIG. 7, it can also include the following.

In S406, the third terminal device transmits the re-determined end-to-end QoS information to the first terminal device.

Correspondingly, the first terminal device receives the re-determined end-to-end QoS information transmitted by the third terminal device.

Exemplarily, the third terminal device may re-determine the end-to-end QoS information according to the received end-to-end QoS information and the re-determined second QoS information.

For example, the third terminal device may re-determine the end-to-end QoS information according to one or more items of information such as a preconfigured data transmission policy, the data processing capability of the third terminal device, data transmission capability, and application-related configuration information, the received end-to-end QoS information and the re-determined second QoS information.

It should be noted that the embodiment of the present disclosure does not limit the specific implementation manner of re-determining the end-to-end QoS information by the third terminal device.

Accordingly, in the case where the third terminal device does not transmit the re-determined end-to-end QoS information to the first terminal device, the first terminal device may re-determine the first QoS information according to the original end-to-end QoS information and the re-determined second QoS information. If in the case where the third terminal device transmits the re-determined end-to-end QoS information to the first terminal device, the first terminal device may re-determine the first QoS information according to the re-determined end-to-end QoS information and the re-determined second QoS information transmitted by the third terminal device.

In S406', the first terminal device transmits the re-determined end-to-end QoS information to the second terminal device.

By re-determining the second QoS information and the first QoS information in this embodiment of the present disclosure, the transmission of service data between the second terminal device, the first terminal device, and the third terminal device is more closely related to the actual situation of each terminal device, thereby guaranteeing the reliability of service data transmission.

Figure 8:
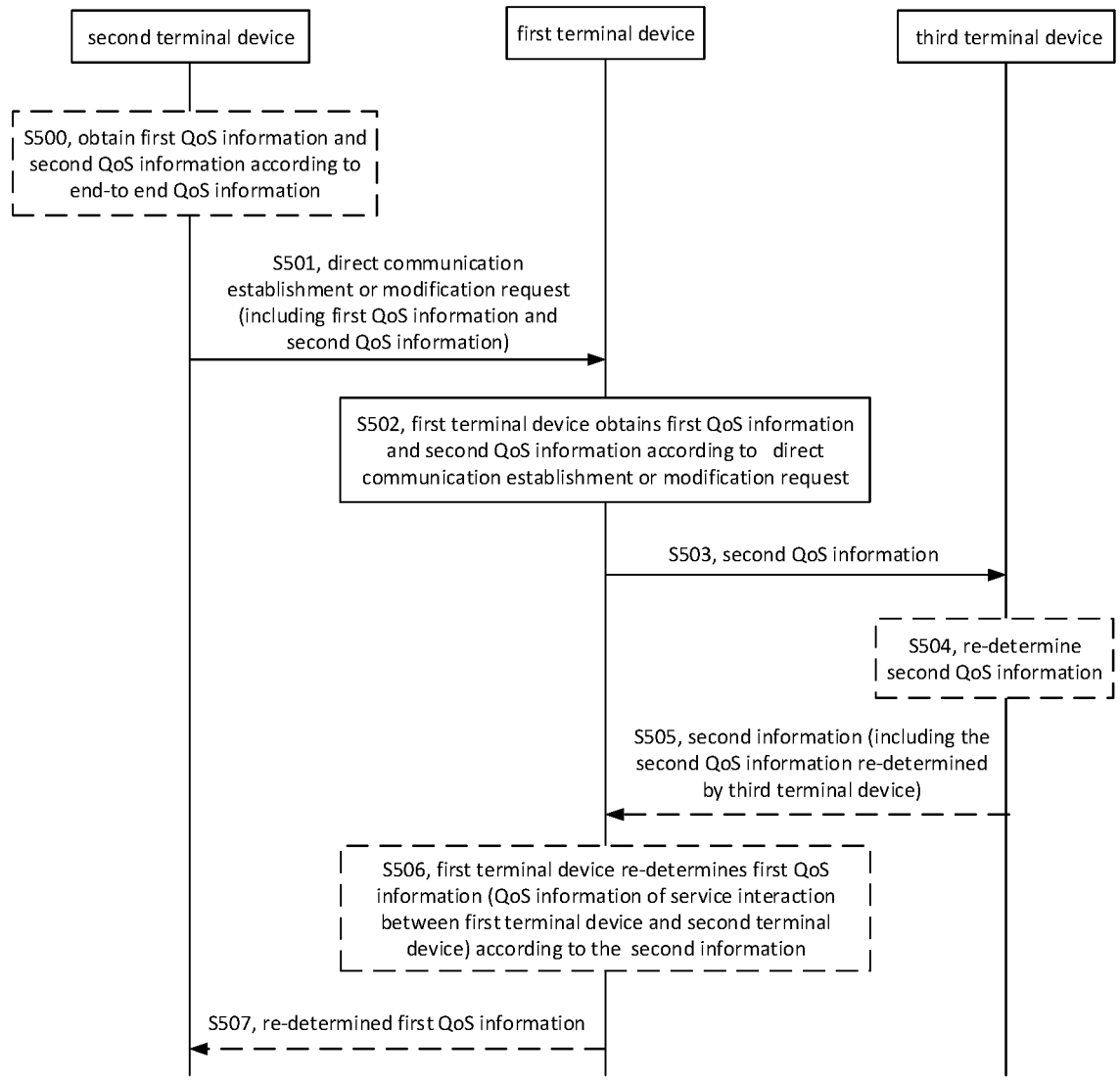
FIG. 8 is a flowchart of a QoS control method provided by another embodiment of the present disclosure.

FIG. 8 is a flowchart of a QoS control method provided by another embodiment of the present disclosure. In this embodiment, the first information includes the first QoS information and the second QoS information. As shown in FIG. 8, the method of this embodiment includes the following.

In S501, the second terminal device transmits direct communication establishment or modification request information to the first terminal device, wherein the direct communication establishment or modification request information includes first QoS information and second QoS information.

Correspondingly, the first terminal device receives the direct communication establishment or modification request information transmitted by the second terminal device.

In S502, the first terminal device obtains the first QoS information and the second QoS information according to the direct communication establishment or modification request information.

Specifically, the first terminal device may directly obtain the second QoS information from the direct communication establishment or modification request information.

In S503, the first terminal device transmits the second QoS information to the third terminal device.

Correspondingly, the third terminal device receives the second QoS information transmitted by the first terminal device, so as to obtain the QoS information of the service interaction between the first terminal device and the third terminal device.

In this embodiment, the second terminal device transmits the direct communication establishment or modification request to the first terminal device, and the direct communication establishment or modification request information includes the first QoS information and the second QoS information. The first terminal device may directly obtain the first QoS information and the second QoS information according to the direct communication establishment or modification request information, and transmit the second QoS information to the third terminal device. With the method in this embodiment, the second terminal device, the first terminal device, and the third terminal device can all obtain corresponding QoS information, thereby ensuring the quality of data transmission of the service interacted between the second terminal device and the third terminal device through the first terminal device. Also, in the method of this embodiment, the first terminal device can directly obtain the first QoS information and the second QoS information from the direct communication establishment or modification request information, without the need of calculation according to the information related to the measurement of the wireless signal or the timestamp carried by the direct communication establishment or modification request information to obtain the first QoS information, or the need of calculation according to the end-to-end QoS information and the first QoS information to obtain the second QoS information. Therefore, the processing efficiency of the first terminal device is improved. Also, in the method of this embodiment, there is no need to transmit end-to-end QoS information.

In some cases, after the first terminal device transmits the second QoS information to the third terminal device, if the third terminal device does not need to update the second QoS information, in this case, the first terminal device also does not need to update the first QoS information to update, then the second terminal device, the first terminal device, and the third terminal device perform service interaction according to the first QoS information and the second QoS information, so as to ensure the data transmission quality of the service interaction between the second terminal device and the third terminal device.

In other cases, after the first terminal device transmits the second QoS information to the third terminal device, the third terminal device determines that the second QoS information needs to be updated, and then transmits the second information to the first terminal device, wherein the second information includes the second QoS information re-determined by the third terminal device.

Optionally, the method of this embodiment further includes the following.

In S504, the third terminal device re-determines the second QoS information.

Exemplarily, the third terminal device may re-determine the second QoS information according to one or more items of information such as a preconfigured data transmission policy, the data processing capability of the third terminal device, data transmission capability, and application-related configuration information.

It should be noted that the embodiment of the present disclosure does not limit the specific implementation manner of the third terminal device re-determining the second QoS information.

In S505, the third terminal device transmits second information to the first terminal device, wherein the second information includes the second QoS information re-determined by the third terminal device.

In S506, the first terminal device re-determines the first QoS information according to the re-determined second QoS information.

In S507, the first terminal device transmits the re-determined first QoS information to the second terminal device.

In a possible implementation manner, the first terminal device may obtain the end-to-end QoS information according to the first QoS information and the second QoS information included in the first information. The first QoS information is re-determined according to the calculated end-to-end QoS information and the re-determined second QoS information transmitted by the third terminal device, and transmit the re-determined first QoS information to the second terminal device. It should be noted that the re-determined second QoS information and the re-determined first QoS information can satisfy the end-to-end QoS information of the service interaction between the second terminal device and the third terminal device.

In this embodiment, the second terminal device transmits the first QoS information and the second QoS information to the first terminal device, so that the first terminal device obtains the first QoS information and the second QoS information. The first terminal device transmits the second QoS information to the third terminal device, so that the third terminal device obtains the second QoS information. In the above manner, corresponding QoS information can be obtained for the second terminal device, the first terminal device and the third terminal device respectively. Therefore, it is ensured that the service interaction between the second terminal device and the third terminal device can satisfy the end-to-end QoS information, and the service quality of the service is guaranteed. In addition, in this embodiment, the first terminal device can directly obtain the first QoS information and the second QoS information from the first information, without the need to obtain the first QoS information according to the measurement result of the wireless signal or the time stamp carried by the first information, or the need to obtain the second QoS information according to the calculation of the end-to-end QoS information, so that the QoS control efficiency can be improved. In this embodiment, there is no need to transmit end-to-end QoS information, signaling overhead can be reduced, and QoS control efficiency can be further improved.

Optionally, on the basis of the embodiment shown in FIG. 8, before S501, it further includes the following.

In S500, the second terminal device obtains the first QoS information and the second QoS information according to the end-to-end QoS information.

Specifically, the second terminal device obtains the end-to-end QoS information according to the trigger of the application, and obtains the first QoS information and the second QoS information according to the end-to-end QoS information and a preset policy, wherein the first QoS information and the second QoS information jointly satisfy the above-mentioned end-to-end QoS information.

Figure 15:
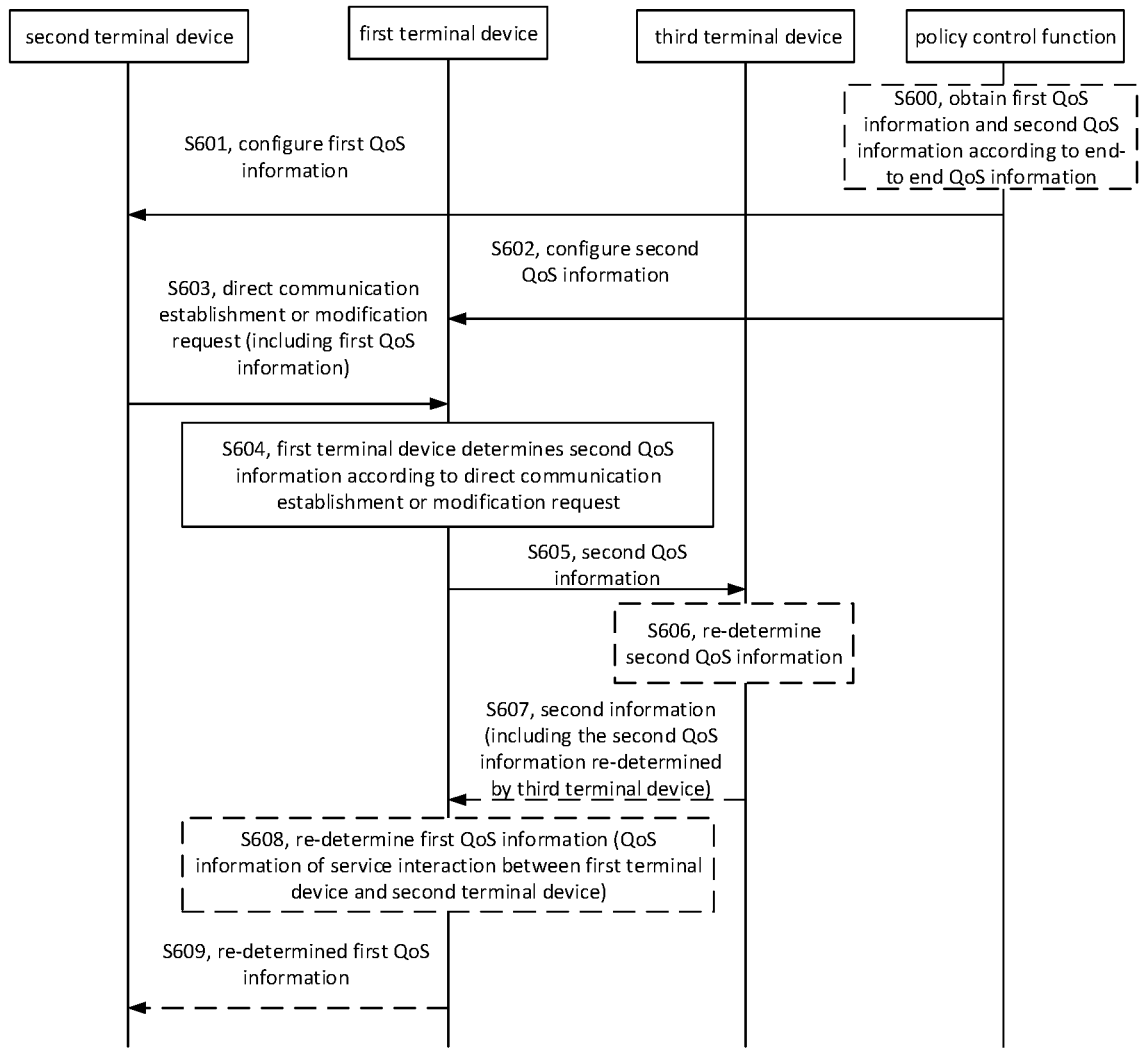
FIG. 15 is a flowchart of a QoS control method provided by another embodiment of the present disclosure.

FIG. 15 is a flowchart of a QoS control method provided by another embodiment of the present disclosure. In this embodiment, the first information is first QoS information. As shown in FIG. 15, the method of this embodiment includes the following.

In S600, the policy control function, including but not limited to a PCF, determines the first QoS information and the second QoS information. Specifically, the policy control function determines the first QoS information and the second QoS information according to the local configuration or the end-to-end QoS information obtained from the application server, wherein, the first QoS information and the second QoS information jointly satisfy the end-to-end QoS information of the service.

In S601, the policy control function transmits a configuration policy including first QoS information and/or corresponding service information to a second terminal device.

In S602, the policy control function transmits a configuration policy including second QoS information and/or corresponding service information to a first terminal device.

In S603, the second terminal device transmits direct communication establishment or modification request information to the first terminal device, wherein the direct communication establishment or modification request information includes the first QoS information. In this step, the second terminal device also provides corresponding service information to the first terminal device.

Correspondingly, the first terminal device receives the direct communication establishment or modification request information transmitted by the second terminal device.

In S604, the first terminal device obtains the second QoS information according to the trigger of the direct communication establishment or modification request information.

Specifically, the first terminal device may directly obtain service information from the direct communication establishment or modification request information according to the received service information, and determine the second QoS information according to the obtained service information. For example, the second QoS information is determined according to the acquired service information and the configuration policy received from the policy control function.

The service information in the above steps includes, but is not limited to, information such as service or application identifiers, service or application types, and the like.

In S605, the first terminal device transmits the second QoS information to the third terminal device.

Correspondingly, the third terminal device receives the second QoS information transmitted by the first terminal device, to obtain the QoS information of the service interaction between the first terminal device and the third terminal device.

In this embodiment, before the second terminal device initiates the service, the policy control function configures the first QoS information to the second terminal, and configures the second QoS information to the first terminal. The second terminal device transmits a direct communication establishment or modification request to the first terminal device, and the direct communication establishment or modification request information includes the first QoS information. The first terminal device may obtain the second QoS information according to the trigger of the direct communication establishment or modification request information and the configuration policy obtained from the policy control function, and transmit the second QoS information to the third terminal device. With the method in this embodiment, the second terminal device, the first terminal device, and the third terminal device can all obtain corresponding QoS information. Thereby, the quality of data transmission of the service interacted between the second terminal device and the third terminal device through the first terminal device. In addition, in the method of this embodiment, the first terminal device can obtain the second QoS information from the configuration policy obtained by the policy control function, without calculation, which improves the processing efficiency of the first terminal device. In the method of this embodiment, there is no need to transmit end-to-end QoS information.

In some cases, after the first terminal device transmits the second QoS information to the third terminal device, if the third terminal device does not need to update the second QoS information, in this case, if the first terminal device also does not need to update the first QoS information to update, then the second terminal device, the first terminal device, and the third terminal device perform service interaction according to the first QoS information and the second QoS information, so as to ensure the data transmission quality of the service interaction between the second terminal device and the third terminal device.

In other cases, after the first terminal device transmits the second QoS information to the third terminal device, the third terminal device determines that the second QoS information needs to be updated, and then transmits the second information to the first terminal device, wherein the second information includes the second QoS information re-determined by the third terminal device.

Optionally, the method of this embodiment further includes the following.

In S606, the third terminal device re-determines the second QoS information.

Exemplarily, the third terminal device may re-determine the second QoS information according to one or more items of information such as a preconfigured data transmission policy, the data processing capability of the third terminal device, data transmission capability, and application-related configuration information.

It should be noted that the embodiment of the present disclosure does not limit the specific implementation manner of the third terminal device re-determining the second QoS information.

In S607, the third terminal device transmits second information to the first terminal device, wherein the second information includes the second QoS information re-determined by the third terminal device.

In S608, the first terminal device re-determines the first QoS information.

Exemplarily, the first terminal device may re-determine the first QoS information according to one or more items of information such as a preconfigured data transmission policy, the data processing capability of the first terminal device, data transmission capability, and application-related configuration information.

It should be noted that the embodiment of the present disclosure does not limit the specific implementation manner of the first terminal device re-determining the first QoS information. The re-determination of the first QoS information by the first terminal device may be triggered according to S607, or may be an independent behavior of the first terminal device.

In S609, the first terminal device transmits the re-determined first QoS information to the second terminal device.

In this embodiment, the second terminal device performs QoS control between the second terminal device and the first terminal device by transmitting the first QoS information to the first terminal device. The first terminal device obtains the second QoS information according to the trigger of the direct communication establishment or modification request information received from the second terminal device, and transmits the second QoS information to the third terminal device to perform QoS control between the first terminal device and the third terminal device. In the above manner, corresponding QoS information can be acquired for the second terminal device, the first terminal device and the third terminal device respectively. Therefore, it is ensured that the service interaction between the second terminal device and the third terminal device can satisfy the end-to-end QoS information, and the service quality of the service is guaranteed. In this embodiment, there is no need to transmit end-to-end QoS information, which can reduce signaling overhead and further improve QoS control efficiency.

It should be noted that, in practical applications, the above-mentioned embodiments may be implemented independently, or may be used in combination with each other. For example, the third terminal device re-determines the second QoS information, and the first terminal device re-determines the first QoS information, and transmits the re-determined first QoS information to the second terminal device. However, if the second terminal device determines that the received re-determined first QoS information needs to be updated, the method in the foregoing embodiment may be repeatedly performed to renegotiate the first QoS information and the second QoS information.

Figure 9:
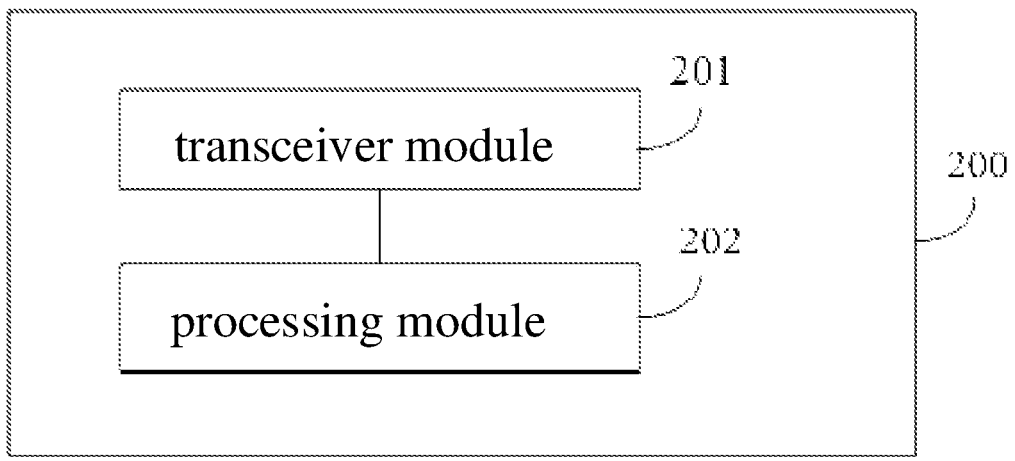
FIG. 9 is a schematic structural diagram of a terminal device provided by an embodiment of the present disclosure.

FIG. 9 is a schematic structural diagram of a terminal device provided by an embodiment of the present disclosure. The terminal device provided in this embodiment is a first terminal device. Referring to FIG. 9, the terminal device 200 provided in this embodiment includes:

a transceiver module 201, configured to receive first information from a second terminal device, wherein the first information is used to request service interaction between the second terminal device and a third terminal device; and a processing module 202, configured to obtain second QoS information according to the first information, wherein the second QoS information is QoS information of the service interaction between the first terminal device and the third terminal device, wherein the transceiver module 201 is further configured to transmit the second QoS information to the third terminal device.

The terminal device provided in this embodiment is configured to implement the technical solution executed by the first terminal device in any of the foregoing method embodiments, and its implementation principle and technical effect are similar, and details are not repeated here.

In some possible designs, the first information includes: end-to-end QoS information of the service interaction between the second terminal device and the third terminal device.

In some possible designs, the processing module 202 is specifically configured to obtain first QoS information, wherein the first QoS information is QoS information of the service interaction between the first terminal device and the second terminal device; and obtain the second QoS information according to the end-to-end QoS information and the first QoS information, wherein the first QoS information and the second QoS information jointly satisfy the end-to-end QoS information.

In some possible designs, the processing module 202 is specifically configured to obtain the first QoS information according to a signal transmission quality with the second terminal device.

In some possible designs, the processing module 202 is specifically configured to obtain the first QoS information according to a timestamp carried by the first information and a current time.

In some possible designs, the first information further includes: the first QoS information.

In some possible designs, the transceiver module 201 is further configured to transmit the end-to-end QoS information to the third terminal device.

In some possible designs, wherein the first information includes the first QoS information and the second QoS information, wherein the first QoS information is QoS information of the service interaction between the first terminal device and the second terminal device, and the second QoS information is QoS information of the service interaction between the first terminal device and the third terminal device.

In some possible designs, the transceiver module 201 is further configured to transmit the first QoS information to the second terminal device.

In some possible designs, the transceiver module 201 is further configured to receive second information transmitted by the third terminal device, wherein the second information includes the second QoS information re-determined by the third terminal device, the processing module 202 is further configured to re-determine the first QoS information according to the second information; and the transceiver module 201 is specifically configured to transmit the first QoS information re-determined by the first terminal device to the second terminal device.

In some possible designs, the transceiver module 201 is further configured to receive re-determined end-to-end QoS information transmitted by the third terminal device; and transmit the end-to-end QoS information re-determined by the third terminal device to the second terminal device.

In some possible designs, the first terminal device may further be used to implement the technical solution executed by the first terminal device in the embodiment shown in FIG. 15. Specifically, the transceiver module 201 is further configured to receive the second QoS information and/or the configuration policy of the corresponding service information transmitted by the policy control function.

In some possible designs, the transceiver module 201 is further configured to receive direct communication establishment or modification request information transmitted by the second terminal device, wherein the direct communication establishment or modification request information includes first QoS information. In this step, the second terminal device also provides corresponding service information to the first terminal device.

In some possible designs, the processing module 202 is further configured to obtain the second QoS information according to the trigger of the direct communication establishment or modification request information. Specifically, the first terminal device may directly obtain service information from the direct communication establishment or modification request information according to the received service information, and determine the second QoS information according to the obtained service information. For example, the second QoS information is determined according to the acquired service information and the configuration policy received from the policy control function.

In some possible designs, the transceiver module 201 is further configured to transmit the second QoS information to the third terminal device.

In some cases, after the first terminal device transmits the second QoS information to the third terminal device, the third terminal device determines that the second QoS information needs to be updated, and then transmits the second information to the first terminal device, wherein the second information includes the second QoS information re-determined by the third terminal device.

In some possible designs, the transceiver module 201 is further configured to receive second information transmitted by the third terminal device, where the second information includes the second QoS information re-determined by the third terminal device.

In some possible designs, the processing module 202 is further configured to re-determine the first QoS information.

Exemplarily, the first terminal device may re-determine the first QoS information according to one or more of information such as a preconfigured data transmission policy, the data processing capability of the first terminal device, data transmission capability, and application-related configuration information.

It should be noted that the embodiment of the present disclosure does not limit the specific implementation manner of the first terminal device re-determining the first QoS information. The re-determination of the first QoS information by the first terminal device may be triggered according to S607, or may be an independent behavior of the first terminal device.

In some possible designs, the transceiver module 201 is further configured to transmit the re-determined first QoS information to the second terminal device.

Figure 10:
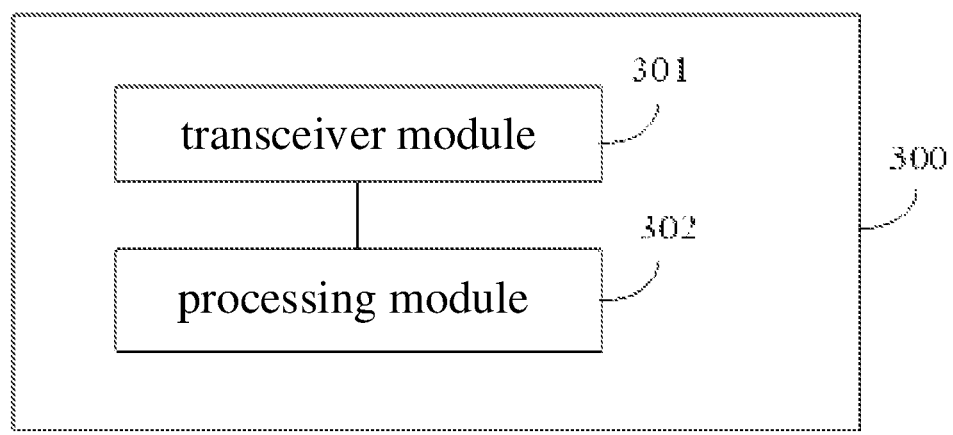
FIG. 10 is a schematic structural diagram of a terminal device provided by another embodiment of the present disclosure.

FIG. 10 is a schematic structural diagram of a terminal device provided by another embodiment of the present disclosure. The terminal device provided in this embodiment is a second terminal device. Referring to FIG. 10, the terminal device 300 provided in this embodiment includes:

a transceiver module 301, configured to transmit first information to a first terminal device, wherein the first information is used to request service interaction between the second terminal device and a third terminal device; and a processing module 302, configured to obtain first QoS information, wherein the first QoS information is QoS information of the service interaction between the second terminal device and the first terminal device.

The terminal device provided in this embodiment is configured to implement the technical solution executed by the second terminal device in any of the foregoing method embodiments, and its implementation principle and technical effect are similar, and details are not repeated here.

In some possible designs, the first information includes: end-to-end QoS information of the service interaction between the second terminal device and the third terminal device.

In some possible designs, the first information further includes: the first QoS information, wherein the first QoS information is QoS information of the service interaction between the first terminal device and the second terminal device.

In some possible designs, the first information includes: the first QoS information and second QoS information, wherein the first QoS information is QoS information of the service interaction between the first terminal device and the second terminal device, and the second QoS information is QoS information of the service interaction between the first terminal device and the third terminal device.

In some possible designs, the processing module 302 is further configured to obtain the first QoS information and the second QoS information according to end-to-end QoS information, wherein the end-to-end QoS information is QoS information of the service interaction between the second terminal device and the third terminal device.

In some possible designs, the transceiver module 301 is further configured to receive the first QoS information transmitted by the first terminal device.

In some possible designs, the transceiver module 301 is further configured to receive the end-to-end QoS information re-determined by the third terminal device and transmitted by the first terminal device.

In some possible designs, the second terminal device may also be used to implement the technical solution executed by the second terminal device in the embodiment shown in FIG. 15. Specifically, the transceiver module 301 is further configured to receive the first QoS information and or the configuration policy of the corresponding service information transmitted by the policy control function.

In some possible designs, the transceiver module 301 is further configured to transmit direct communication establishment or modification request information to the first terminal device, wherein the direct communication establishment or modification request information includes the first QoS information. In this step, the second terminal device also provides corresponding service information to the first terminal device.

In other cases, after the first terminal device transmits the second QoS information to the third terminal device, the third terminal device determines that the second QoS information needs to be updated, and then transmits the second information to the first terminal device, wherein the second information includes the second QoS information re-determined by the third terminal device; and the first terminal device will transmit the re-determined first QoS information to the second terminal device.

In some possible designs, the transceiver module 301 is further configured to receive the re-determined first QoS information transmitted by the first terminal device.

Figure 11:
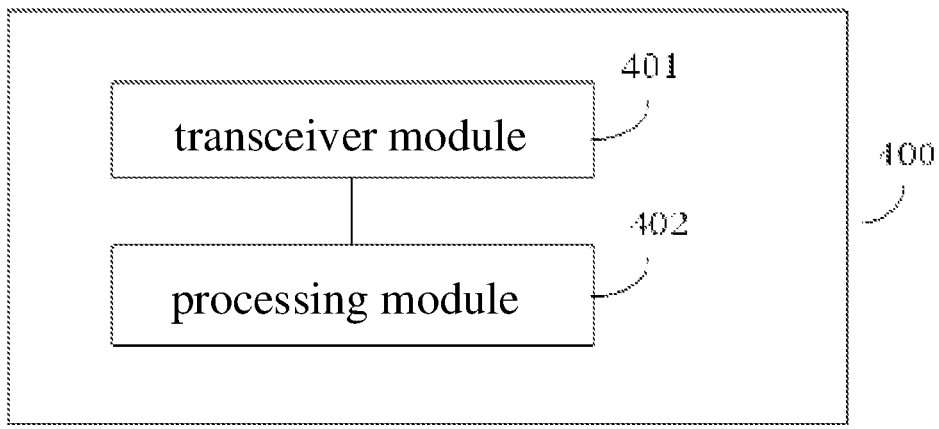
FIG. 11 is a schematic structural diagram of a terminal device provided by another embodiment of the present disclosure.

FIG. 11 is a schematic structural diagram of a terminal device according to another embodiment of the present disclosure. The terminal device provided in this embodiment is a third terminal device. Referring to FIG. 11, the terminal device 400 provided in this embodiment includes:

a transceiver module 401, configured to receive second QoS information transmitted by a first terminal device, wherein the second QoS information is QoS information for service interaction between the first terminal device and the third terminal device.

The terminal device provided in this embodiment of the present disclosure is configured to implement the technical solution executed by the third terminal device in any of the foregoing method embodiments, and the implementation principle and technical effect thereof are similar, and details are not described herein again.

In some possible designs, the transceiver module 401 is further configured to receive end-to-end QoS information from the first terminal device, wherein the end-to-end QoS information is end-to-end QoS information of the service interaction between a second terminal device and the third terminal device.

In some possible designs, the terminal device 400 further includes: a processing module 402, configured to re-determine the second QoS information, wherein the transceiver module 401 is further configured to transmit second information to the first terminal device, wherein the second information includes the second QoS information re-determined by the third terminal device.

In some possible designs, the transceiver module 401 is further configured to transmit re-determined end-to-end QoS information to the first terminal device.

In some possible designs, the third terminal device may also be used to implement the technical solution executed by the third terminal device in the embodiment shown in FIG. 15. Specifically, the transceiver module 401 is further configured to receive the second QoS information transmitted by the first terminal device, to obtain the QoS information of the service interaction between the first terminal device and the third terminal device.

In some cases, after the first terminal device transmits the second QoS information to the third terminal device, if the third terminal device does not need to update the second QoS information, in this case, if the first terminal device also does not need to update the first QoS information to update, then the second terminal device, the first terminal device, and the third terminal device perform service interaction according to the first QoS information and the second QoS information, so as to ensure the data transmission quality of the service interaction between the second terminal device and the third terminal device.

In other cases, after the first terminal device transmits the second QoS information to the third terminal device, the third terminal device determines that the second QoS information needs to be updated, and then transmits the second information to the first terminal device, wherein the second information includes the second QoS information re-determined by the third terminal device.

In some possible designs, the processing module 402 is further configured to re-determine the second QoS information.

Exemplarily, the third terminal device may re-determine the second QoS information according to one or more items of information such as a preconfigured data transmission policy, the data processing capability of the third terminal device, data transmission capability, and application-related configuration information.

It should be noted that the embodiment of the present disclosure does not limit the specific implementation manner of the third terminal device re-determining the second QoS information.

In some possible designs, the transceiver module 401 is further configured to transmit second information to the first terminal device, where the second information includes second QoS information re-determined by the third terminal device.

Figure 12:
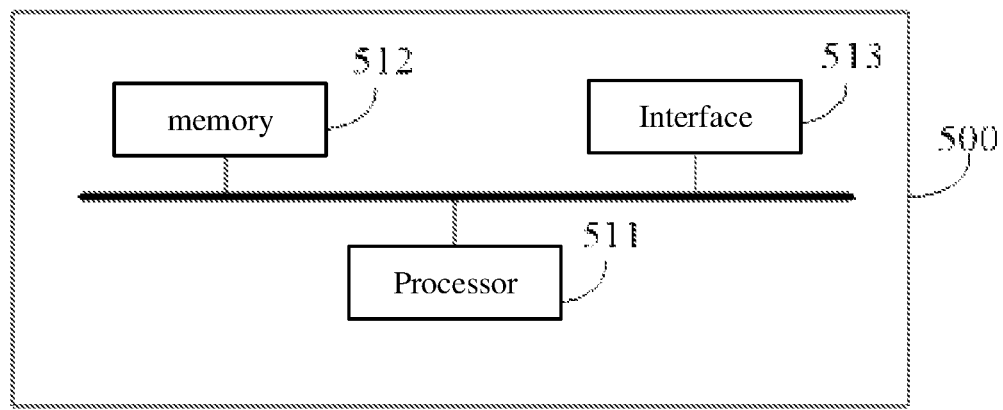
FIG. 12 is a schematic structural diagram of an electronic device provided by an embodiment of the disclosure.

FIG. 12 is a schematic structural diagram of an electronic device according to an embodiment of the present disclosure. The electronic device is a first terminal device. As shown in FIG. 12, the electronic device 500 includes: a processor 511, a memory 512, and computer program instructions.

The memory 512 stores computer-executable instructions.

The processor 511 executes the computer-executable instructions stored in the memory, so that the processor 511 executes the technical solutions on the first terminal device side in any of the foregoing method embodiments.

In the embodiment shown in FIG. 12, the electronic device 500 further includes: an interface 513 for communicating with other devices, such as the second terminal device and the third terminal device. It should be noted that FIG. 12 is a simple design of the first terminal device, the embodiment of the present disclosure does not limit the number of processors and memories in the first terminal device, and FIG. 12 only uses 1 as an example for description.

Figure 13:
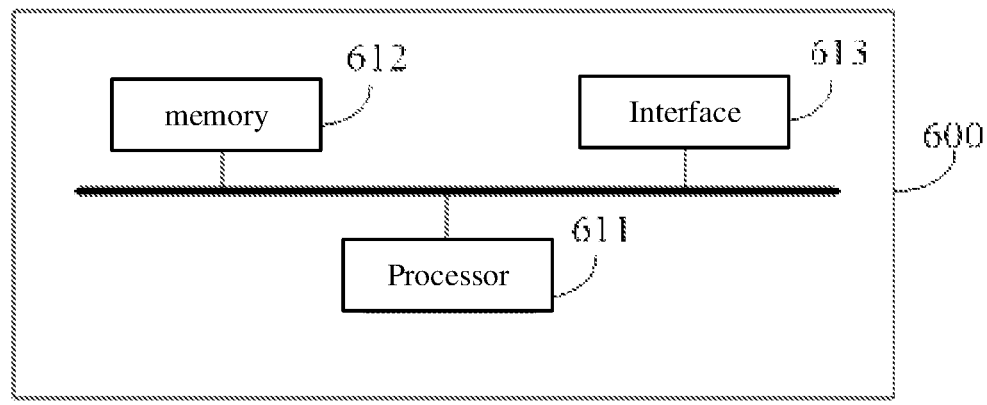
FIG. 13 is a schematic structural diagram of an electronic device provided by another embodiment of the disclosure.

FIG. 13 is a schematic structural diagram of an electronic device according to an embodiment of the present disclosure. The electronic device is a second terminal device. As shown in FIG. 13, the electronic device 600 includes: a processor 611, a memory 612, and computer program instructions.

The memory 612 stores computer-executable instructions.

The processor 611 executes the computer-executable instructions stored in the memory, so that the processor 611 executes the technical solutions on the second terminal device side in any of the foregoing method embodiments.

In the embodiment shown in FIG. 13, the electronic device 600 further includes: an interface 613 for communicating with other devices, such as the first terminal device. It should be noted that FIG. 13 is a simple design of the second terminal device, the embodiment of the present disclosure does not limit the number of processors and memories in the second terminal device, and FIG. 13 only uses 1 as an example for description.

Figure 14:
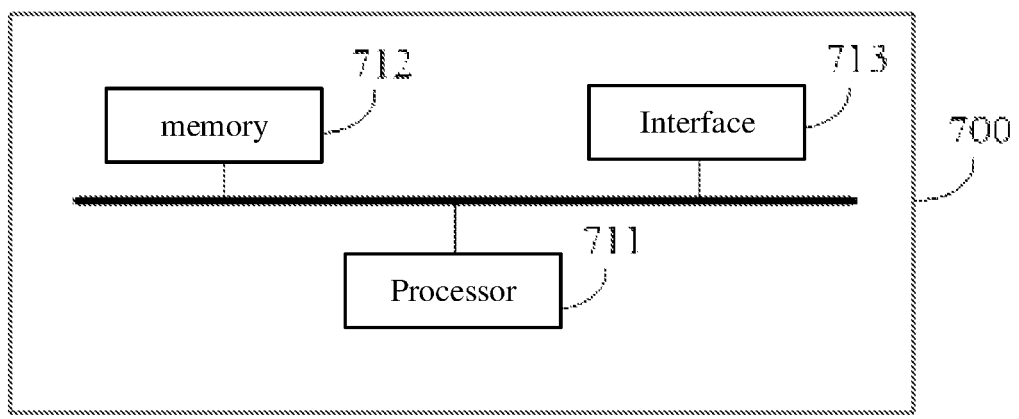
FIG. 14 is a schematic structural diagram of an electronic device provided by another embodiment of the disclosure.

FIG. 14 is a schematic structural diagram of an electronic device according to an embodiment of the present disclosure. The electronic device is a third terminal device. As shown in FIG. 14, the electronic device 700 includes: a processor 711, a memory 712, and computer program instructions.

The memory 712 stores computer-executable instructions.

The processor 711 executes the computer-executable instructions stored in the memory, so that the processor 711 executes the technical solutions on the third terminal device side in any of the foregoing method embodiments.

In the embodiment shown in FIG. 14, the electronic device 700 further includes: an interface 713 for communicating with other devices, such as the first terminal device. It should be noted that FIG. 14 is a simple design of the third terminal device, the embodiment of the present disclosure does not limit the number of processors and memories in the third terminal device, and FIG. 14 only uses 1 as an example for description.

In a specific implementation of the electronic device shown in FIG. 12 to FIG. 14, the memory, the processor and the interface may be connected through a bus, and optionally, the memory may be integrated inside the processor.

An embodiment of the present disclosure further provides a computer-readable storage medium, wherein computer-executable instructions are stored in the computer-readable storage medium, and when the computer-executable instructions are executed by a processor, are used to implement the technical solution of the terminal device according to any one of the above method embodiments.

An embodiment of the present disclosure further provides a computer-readable storage medium, wherein computer-executable instructions are stored in the computer-readable storage medium, and when the computer-executable instructions are executed by a processor, are used to implement the QoS control method executed by the first terminal device according to any one of the above embodiments.

An embodiment of the present disclosure further provides a computer-readable storage medium, wherein computer-executable instructions are stored in the computer-readable storage medium, and when the computer-executable instructions are executed by a processor, are used to implement the QoS control method executed by the second terminal device according to any one of the above embodiments.

An embodiment of the present disclosure further provides a computer-readable storage medium, wherein computer-executable instructions are stored in the computer-readable storage medium, and when the computer-executable instructions are executed by a processor, are used to implement the QoS control method executed by the third terminal device according to any one of the above embodiments.

An embodiment of the present disclosure further provides a program, which, when being executed by a processor, is used to implement the QoS control method executed by the first terminal device according to any one of the above embodiments.

An embodiment of the present disclosure further provides a program, which, when being executed by a processor, is used to implement the QoS control method executed by the second terminal device according to any one of the above embodiments.

An embodiment of the present disclosure further provides a program, which, when being executed by a processor, is used to implement the QoS control method executed by the third terminal device according to any one of the above embodiments.

An embodiment of the present disclosure further provides a program product including program instructions used to implement the QoS control method executed by the first terminal device according to any one of the above embodiments.

An embodiment of the present disclosure further provides a program product including program instructions used to implement the QoS control method executed by the second terminal device according to any one of the above embodiments.

An embodiment of the present disclosure further provides a program product including program instructions used to implement the QoS control method executed by the third terminal device according to any one of the above embodiments.

An embodiment of the present disclosure provides a chip, including a processing module and a communication interface, wherein the processing module may implement the QoS control method executed by the first terminal device according to any one of the above embodiments.

Further, the chip further includes a storage module (e.g., a memory), the storage module is used for storing instructions, the processing module is used for executing the instructions stored in the storage module, and the execution of the instructions stored in the storage module causes the processing module to implement the QoS control method executed by the first terminal device according to any one of the above embodiments.

An embodiment of the present disclosure provides a chip, including a processing module and a communication interface, wherein the processing module may implement the QoS control method executed by the second terminal device according to any one of the above embodiments.

Further, the chip further includes a storage module (e.g., a memory), the storage module is used for storing instructions, the processing module is used for executing the instructions stored in the storage module, and the execution of the instructions stored in the storage module causes the processing module to implement the QoS control method executed by the second terminal device according to any one of the above embodiments.

An embodiment of the present disclosure provides a chip, including a processing module and a communication interface, wherein the processing module may implement the QoS control method executed by the third terminal device according to any one of the above embodiments.

Further, the chip further includes a storage module (e.g., a memory), the storage module is used for storing instructions, the processing module is used for executing the instructions stored in the storage module, and the execution of the instructions stored in the storage module causes the processing module to implement the QoS control method executed by the third terminal device according to any one of the above embodiments.

In the several embodiments provided in this disclosure, it should be understood that the disclosed apparatus and method may be implemented in other manners. For example, the apparatus embodiments described above are merely illustrative. For example, the division of the modules is only a logical function division, and there may be other division methods in actual implementation. For example, multiple modules may be combined or may be integrated into another system, or some features may be omitted, or not implemented. On the other hand, the mutual coupling or direct coupling or communication connection shown or discussed may be through some interfaces, and the indirect coupling or communication connection of modules may be in electrical, mechanical or other forms.

In the specific implementation of the above-mentioned terminal equipment and network equipment, it should be understood that the processor may be a central processing unit (CPU), or other general-purpose processors, digital signal processors (DSP), application specific integrated circuit (ASIC) and so on. A general-purpose processor may be a microprocessor or the processor may be any conventional processor or the like. The steps in combination with the method disclosed in the present disclosure can be directly embodied as executed by a hardware processor, or executed by a combination of hardware and software modules in the processor.

All or part of the steps for implementing the above method embodiments may be completed by program instructions related to hardware. The aforementioned program can be stored in a readable memory. When the program is executed, it executes the steps including the above method embodiments. The aforementioned memory (storage medium) includes: read-only memory (ROM), RAM, flash memory, hard disk, solid state drive, magnetic tape, floppy disk, optical disc and any combination thereof.

What is claimed is:

1. A quality of service (QOS) control method, comprising:
   receiving, by a first terminal device, first information from a second terminal device, wherein the first information is used to request a first service interaction between the second terminal device and a third terminal device, and wherein the first information comprises end-to-end QoS information of the first service interaction between the second terminal device and the third terminal device;
   determining, by the first terminal device, second QoS information according to the first information, wherein the second QoS information is QoS information of a second service interaction between the first terminal device and the third terminal device; and
   transmitting, by the first terminal device, the second QoS information to the third terminal device,
   wherein the determining, by the first terminal device, the second QoS information according to the first information comprises: determining, by the first terminal device, first QoS information, wherein the first QoS information is QoS information of a third service interaction between the first terminal device and the second terminal device; and determining, by the first terminal device, the second QoS information according to the end-to-end QoS information and the first QoS information, wherein the first QoS information and the second QoS information jointly satisfy the end-to-end QoS information, and
   wherein the method further comprises: transmitting, by the first terminal device, the first QoS information to the second terminal device.

2. The method according to claim 1, wherein the transmitting, by the first terminal device, the first QoS information to the second terminal device comprises:
   receiving, by the first terminal device, second information transmitted by the third terminal device, wherein the second information comprises the second QoS information re-determined by the third terminal device;
   re-determining, by the first terminal device, the first QoS information according to the second information; and
   transmitting, by the first terminal device, the first QoS information re-determined by the first terminal device to the second terminal device.

3. The method according to claim 1, wherein the obtaining, by the first terminal device, the first QoS information comprises:
   obtaining, by the first terminal device, the first QoS information according to a signal transmission quality with the second terminal device.

4. The method according to claim 1, wherein the obtaining, by the first terminal device, the first QoS information comprises:
   obtaining, by the first terminal device, the first QoS information according to a timestamp carried by the first information and a current time.

5. The method according to claim 1, wherein the first information further comprises: the first QoS information.

6. The method according to claim 1, further comprising:
   transmitting, by the first terminal device, the end-to-end QoS information to the third terminal device.

7. A terminal device, wherein the terminal device is a first terminal device, and comprises: a processor, a memory, and computer-executable instructions,
   wherein the memory stores the computer-executable instructions, and
   wherein the processor is configured to execute the computer-executable instructions stored in the memory, to cause the terminal device to perform a quality of service (QoS) control method comprising:
   receiving first information from a second terminal device, wherein the first information is used to request a first service interaction between the second terminal device and a third terminal device, and wherein the first information comprises end-to-end QoS information of the first service interaction between the second terminal device and the third terminal device;
   determining second QoS information according to the first information, wherein the second QoS information is QoS information of a second service interaction between the first terminal device and the third terminal device; and
   transmitting the second QoS information to the third terminal device,
   wherein the terminal device is specifically configured to: determine first QoS information, wherein the first QoS information is QoS information of a third service interaction between the first terminal device and the second terminal device; and determine the second QoS information according to the end-to-end QoS information and the first QoS information, wherein the first QoS information and the second QoS information jointly satisfy the end-to-end QoS information, and
   wherein the terminal device is further configured to transmit the first QoS information to the second terminal device.

8. The terminal device according to claim 7, wherein the terminal device is further configured to:

receive second information transmitted by the third terminal device, wherein the second information comprises the second QoS information re-determined by the third terminal device;

re-determine the first QoS information according to the second information; and transmit the first QoS information re-determined by the first terminal device to the second terminal device.

9. The terminal device according to claim 7, wherein the terminal device is further configured to obtain the first QoS information according to a signal transmission quality with the second terminal device.

10. The terminal device according to claim 7, wherein the terminal device is further configured to obtain the first QoS information according to a timestamp carried by the first information and a current time.

11. The terminal device according to claim 7, wherein the first information further comprises: the first QoS information.

12. The terminal device according to claim 7, wherein the terminal device is further configured to transmit the end-to-end QoS information to the third terminal device.

13. A terminal device, wherein the terminal device is a second terminal device, and comprises: a processor, a memory, and computer-executable instructions, wherein the memory stores the computer-executable instructions, and wherein the processor is configured to execute the computer-executable instructions stored in the memory, to cause the terminal device to perform a QoS control method comprising:

transmitting first information to a first terminal device, wherein the first information is used to request a first service interaction between the second terminal device and a third terminal device; and obtaining first QoS information transmitted by the first terminal device, wherein the first QoS information is QoS information of a third service interaction between the second terminal device and the first terminal device, wherein the first information comprises end-to-end QoS information of the first service interaction between the second terminal device and the third terminal device, and wherein the first the first information comprises: the first QoS information and second QoS information, wherein the first QoS information is QoS information of the third service interaction between the first terminal device and the second terminal device, and the second QoS information is QoS information of a second service interaction between the first terminal device and the third terminal device determined according to the end-to-end QoS information and the first QoS information, wherein the first QoS information and the second QoS information jointly satisfy the end-to-end QoS information.

14. The terminal device according to claim 13, wherein the terminal device is further configured to receive the end-to-end QoS information re-determined by the third terminal device and transmitted by the first terminal device.

* * * * *